United States Patent
Xue et al.

(10) Patent No.: US 12,075,387 B2
(45) Date of Patent: *Aug. 27, 2024

(54) PRIORITIZED DISCOVERY FOR HIGH SPECTRAL EFFICIENCY NR SIDELINK

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,910

(22) Filed: Jun. 15, 2023

(65) Prior Publication Data

US 2023/0413236 A1    Dec. 21, 2023

Related U.S. Application Data

(63) Continuation of application No. 17/187,316, filed on Feb. 26, 2021, now Pat. No. 11,722,992.

(51) Int. Cl.
*H04W 72/02* (2009.01)
*H04L 1/1607* (2023.01)
(Continued)

(52) U.S. Cl.
CPC ........... *H04W 72/02* (2013.01); *H04L 1/1614* (2013.01); *H04W 72/23* (2023.01); *H04W 76/11* (2018.02)

(58) Field of Classification Search
CPC . H04W 72/1263; H04W 72/02; H04W 72/14; H04W 72/042; H04W 76/11;
(Continued)

(56) References Cited

U.S. PATENT DOCUMENTS

| 8,358,982 B2 | 1/2013 | Van Der Velde et al. |
| 2009/0180451 A1* | 7/2009 | Alpert ............... H04W 72/1215 370/338 |

(Continued)

FOREIGN PATENT DOCUMENTS

| WO | 2020033086 A1 | 2/2020 |
| WO | 2020033089 A1 | 2/2020 |

OTHER PUBLICATIONS

Fujitsu: "Considerations on Inter-UE Coordination for Mode 2 Enhancements", 3GPP TSG RAN WG1 Meeting #104-e, R1-2100746, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 18, 2021, XP051970499, pp. 1-21.
(Continued)

*Primary Examiner* — Wei Zhao
(74) *Attorney, Agent, or Firm* — Patterson & Sheridan, L.L.P/Qualcomm Incorporated

(57) ABSTRACT

Certain aspects of the present disclosure provide a user equipment (UE) that may receive an indication of a proximity discovery resource in a physical sidelink feedback channel (PSFCH) symbol from a network entity. The UE may transmit a proximity discovery request including the indication of the proximity discovery resource. The UE may receive a PSFCH sequence associated with the proximity discovery resource from other UEs that may respond to the proximity discovery request. The UE may transmit a bit map sequence indicative of the other UEs to the network entity. The network entity may determine a proximity between the
(Continued)

UE and the other UEs based on the bit map sequence. The network entity may schedule the UE and the other UEs based on the proximity.

20 Claims, 19 Drawing Sheets

(51) Int. Cl.
 *H04W 72/23* (2023.01)
 *H04W 76/11* (2018.01)
(58) Field of Classification Search
 CPC ......... H04W 72/0446; H04W 72/0406; H04W 72/0453; H04L 1/1614; H04L 1/181; H04L 1/1819; H04L 5/0048
 See application file for complete search history.

(56) References Cited

U.S. PATENT DOCUMENTS

| | | |
|---|---|---|
| 2011/0244800 A1 | 10/2011 | Bogestam et al. |
| 2012/0188988 A1 | 7/2012 | Chung et al. |
| 2014/0185530 A1 | 7/2014 | Kuchibhotla et al. |
| 2021/0306824 A1* | 9/2021 | Li .......................... H04W 4/40 |
| 2022/0279482 A1 | 9/2022 | Xue et al. |
| 2022/0294570 A1* | 9/2022 | Hahn .................... H04L 5/0055 |

OTHER PUBLICATIONS

International Search Report and Written Opinion—PCT/US2022/070274—ISA/EPO—May 10, 2022.

* cited by examiner

PRIORITIZED DISCOVERY FOR HIGH SPECTRAL EFFICIENCY NR SIDELINK

CLAIM OF PRIORITY UNDER 35 U.S.C. § 120

The present Application for Patent is a continuation of patent application Ser. No. 17/187,316, entitled "PRIORITIZED DISCOVERY FOR HIGH SPECTRAL EFFICIENCY NR SIDELINK" filed Feb. 26, 2021, pending, and assigned to the assignee hereof and hereby expressly incorporated by reference herein.

BACKGROUND

Field of the Disclosure

Aspects of the present disclosure relate to wireless communications and, more particularly, to proximity discovery techniques for determining proximity between sidelink user equipments (UEs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., $5^{th}$ generation (5G) NR) is an example of an emerging telecommunication standard. The NR is a set of enhancements to the LTE mobile standard promulgated by the 3GPP. The NR is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, the NR supports beamforming, multiple-input multiple-output (MIMO) antenna technology, and carrier aggregation.

However, as the demand for mobile broadband access continues to increase, there exists a need for further improvements in the NR and the LTE technology. These improvements should be applicable to other multi-access technologies and the telecommunication standards that employ these technologies.

SUMMARY

Systems, methods, and devices of the present disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and desirable proximity discovery techniques for determining proximity of sidelink user equipments (UEs) with respect to each other to generate a sidelink jamming graph directly, promptly and with a minimal signaling overhead.

Certain aspects of the subject matter described in this disclosure can be implemented in a method for wireless communication by a UE. The method generally includes receiving, from a network entity, an indication of a proximity discovery resource in a physical sidelink feedback channel (PSFCH) symbol; transmitting a proximity discovery request comprising the indication of the proximity discovery resource; receiving, from one or more other UEs, a PSFCH sequence associated with the proximity discovery resource; and transmitting, to the network entity, a bit map sequence indicative of the one or more other UEs.

Certain aspects of the subject matter described in this disclosure can be implemented in a method for wireless communication by a first UE. The method generally includes receiving, from a second UE, a proximity discovery request comprising an indication of a proximity discovery resource in a PSFCH symbol; and transmitting, to the second UE, a PSFCH sequence associated with the proximity discovery resource.

Certain aspects of the subject matter described in this disclosure can be implemented in a method for wireless communication by a network entity. The method generally includes transmitting, to a UE, an indication of a proximity discovery resource in a PSFCH symbol causing the UE to transmit a proximity discovery request comprising the indication of the proximity discovery resource; and receiving, from the UE, a bit map sequence indicative of one or more other UEs that had responded to the proximity discovery request.

Certain aspects of the subject matter described in this disclosure can be implemented in an apparatus for wireless communication. The apparatus generally includes at least one processor and a memory configured to receive, from a network entity, an indication of a proximity discovery resource in a PSFCH symbol; transmit a proximity discovery request comprising the indication of the proximity discovery resource; receive, from one or more other UEs, a PSFCH sequence associated with the proximity discovery resource; and transmit, to the network entity, a bit map sequence indicative of the one or more other UEs.

Certain aspects of the subject matter described in this disclosure can be implemented in an apparatus for wireless communication. The apparatus generally includes at least one processor and a memory configured to receive, from a second UE, a proximity discovery request comprising an indication of a proximity discovery resource in a PSFCH symbol; and transmit, to the second UE, a PSFCH sequence associated with the proximity discovery resource.

Certain aspects of the subject matter described in this disclosure can be implemented in an apparatus for wireless communication. The apparatus generally includes at least one processor and a memory configured to transmit, to a UE, an indication of a proximity discovery resource in a PSFCH symbol causing the UE to transmit a proximity discovery request comprising the indication of the proximity discovery resource; and receive, from the UE, a bit map sequence indicative of one or more other UEs that had responded to the proximity discovery request.

Certain aspects of the subject matter described in this disclosure can be implemented in an apparatus for wireless communication. The apparatus generally includes means for receiving, from a network entity, an indication of a proximity discovery resource in a PSFCH symbol; means for transmitting a proximity discovery request comprising the indication of the proximity discovery resource; means for receiving, from one or more other UEs, a PSFCH sequence associated with the proximity discovery resource; and means for transmitting, to the network entity, a bit map sequence indicative of the one or more other UEs.

Certain aspects of the subject matter described in this disclosure can be implemented in an apparatus for wireless communication. The apparatus generally includes means for receiving, from a second UE, a proximity discovery request comprising an indication of a proximity discovery resource in a PSFCH symbol; and means for transmitting, to the second UE, a PSFCH sequence associated with the proximity discovery resource.

Certain aspects of the subject matter described in this disclosure can be implemented in an apparatus for wireless communication. The apparatus generally includes means for transmitting, to a UE, an indication of a proximity discovery resource in a PSFCH symbol causing the UE to transmit a proximity discovery request comprising the indication of the proximity discovery resource; and means for receiving, from the UE, a bit map sequence indicative of one or more other UEs that had responded to the proximity discovery request.

Certain aspects of the subject matter described in this disclosure can be implemented in a computer readable medium storing computer executable code thereon for wireless communications. The computer readable medium comprises code for receiving, from a network entity, an indication of a proximity discovery resource in a PSFCH symbol; code for transmitting a proximity discovery request comprising the indication of the proximity discovery resource; code for receiving, from one or more other UEs, a PSFCH sequence associated with the proximity discovery resource; and code for transmitting, to the network entity, a bit map sequence indicative of the one or more other UEs.

Certain aspects of the subject matter described in this disclosure can be implemented in a computer readable medium storing computer executable code thereon for wireless communications. The computer readable medium comprises code for receiving, from a second UE, a proximity discovery request comprising an indication of a proximity discovery resource in a PSFCH symbol; and code for transmitting, to the second UE, a PSFCH sequence associated with the proximity discovery resource.

Certain aspects of the subject matter described in this disclosure can be implemented in a computer readable medium storing computer executable code thereon for wireless communications. The computer readable medium comprises code for transmitting, to a UE, an indication of a proximity discovery resource in a PSFCH symbol causing the UE to transmit a proximity discovery request comprising the indication of the proximity discovery resource; and code for receiving, from the UE, a bit map sequence indicative of one or more other UEs that had responded to the proximity discovery request.

Certain aspects of the subject matter described in this disclosure can be implemented in an apparatus for wireless communication by a UE. The apparatus generally includes an interface configured to: obtain, from a network entity, an indication of a proximity discovery resource in a PSFCH symbol; and a processing system configured to generate a proximity discovery request comprising the indication of the proximity discovery resource, wherein: the interface is further configured to: obtain, from one or more other UEs, a PSFCH sequence associated with the proximity discovery resource; output to the proximity discovery request for transmission; and the processing system is further configured to generate a bit map sequence indicative of the one or more other UEs; and the interface is further configured to output, for transmission to the network entity, the bit map sequence indicative of the one or more other UEs.

Certain aspects of the subject matter described in this disclosure can be implemented in an apparatus for wireless communication by a first UE. The apparatus generally includes an interface configured to: obtain, from a second UE, a proximity discovery request comprising an indication of a proximity discovery resource in a PSFCH symbol; and output, for transmission to the second UE, a PSFCH sequence associated with the proximity discovery resource.

Certain aspects of the subject matter described in this disclosure can be implemented in an apparatus for wireless communication by a network entity. The apparatus generally includes a processing system configured to generate an indication of a proximity discovery resource in a PSFCH symbol causing the UE to transmit a proximity discovery request comprising the indication of the proximity discovery resource; and an interface configured to: output, for transmission to a UE, the indication; and obtain, from the UE, a bit map sequence indicative of one or more other UEs that had responded to the proximity discovery request.

Certain aspects of the subject matter described in this disclosure can be implemented in a computer-readable medium for wireless communications by a UE. The computer-readable medium generally include codes executable to: obtain, from a network entity, an indication of a proximity discovery resource in a PSFCH symbol; generate a proximity discovery request comprising the indication of the proximity discovery resource; obtain, from one or more other UEs, a PSFCH sequence associated with the proximity discovery resource; output to the proximity discovery request for transmission; generate a bit map sequence indicative of the one or more other UEs; and output, for transmission to the network entity, the bit map sequence indicative of the one or more other UEs.

Certain aspects of the subject matter described in this disclosure can be implemented in a computer-readable medium for wireless communications by a first UE. The computer-readable medium generally include codes executable to: obtain, from a second UE, a proximity discovery request comprising an indication of a proximity discovery resource in a PSFCH symbol; and output, for transmission to the second UE, a PSFCH sequence associated with the proximity discovery resource.

Certain aspects of the subject matter described in this disclosure can be implemented in a computer-readable medium for wireless communications by a network entity. The computer-readable medium generally include codes executable to: generate an indication of a proximity discovery resource in a PSFCH symbol causing the UE to transmit a proximity discovery request comprising the indication of the proximity discovery resource; output, for transmission to a UE, the indication; and obtain, from the UE, a bit map sequence indicative of one or more other UEs that had responded to the proximity discovery request.

To the accomplishment of the foregoing and related ends, the one or more aspects comprise the features hereinafter fully described and particularly pointed out in the claims.

The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
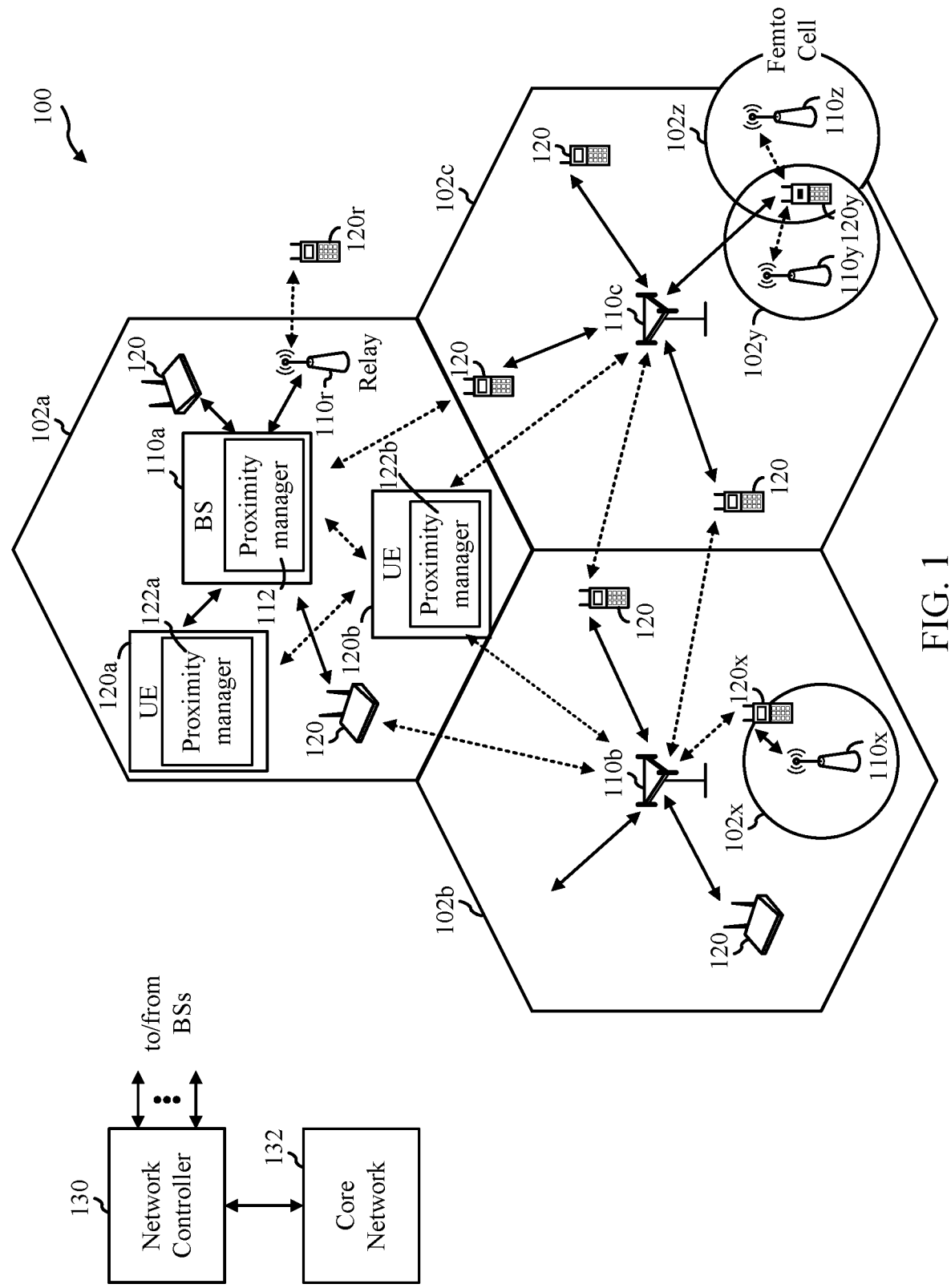
FIG. 1 is a block diagram conceptually illustrating an example wireless communication network, in accordance with certain aspects of the present disclosure.

Aspects of the present disclosure provide apparatus, methods, processing systems, and computer readable mediums for implementing a proximity discovery technique to generate and enable a sidelink jamming graph representing a proximity between multiple sidelink user equipments (UEs). A base station (BS) may use information associated with the sidelink jamming graph to schedule the UEs. The proximity discovery technique described herein may improve sidelink Mode 1 channel access to avoid listen before talk (LBT) blocking when deployed in an unlicensed band. LBT refers to a channel access mechanism where a device senses a channel (listens) to be sure it is clear before accessing the channel for transmission (before talking). LBT blocking refers to a scenario where a transmission by one device is detected during the LBT procedure of another device, blocking (preventing) that device from accessing the channel.

The following description provides examples of proximity discovery techniques, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless communication technologies, such as long term evolution (LTE), code division multiple access (CDMA), time division multiple access (TDMA), frequency division multiple access (FDMA), orthogonal frequency division multiple access (OFDMA), single-carrier frequency division multiple access (SC-FDMA) and other networks. The terms "network" and "system" are often used interchangeably. A CDMA network may implement a radio technology such as universal terrestrial radio access (UTRA), cdma2000, etc. UTRA includes wideband CDMA (WCDMA) and other variants of CDMA. cdma2000 covers IS-2000, IS-95 and IS-856 standards. A TDMA network may implement a radio technology such as global system for mobile communications (GSM). An OFDMA network may implement a radio technology such as new radio (NR) (e.g. $5^{th}$ generation (5G) RA), evolved universal mobile telecommunications system (E-UTRA), ultra-mobile broadband (UMB), IEEE 802.11 (Wi-Fi), IEEE 802.16 (WiMAX), IEEE 802.20, flash-OFDMA, etc. UTRA and E-UTRA are part of universal mobile telecommunication system (UMTS).

NR is an emerging wireless communications technology under development in conjunction with the 5G Technology Forum (5GTF). 3GPP LTE and LTE-Advanced (LTE-A) are releases of the UMTS that use E-UTRA. UTRA, E-UTRA, UMTS, LTE, LTE-A, and global system for mobile communication (GSM) are described in documents from an organization named "3rd Generation Partnership Project" (3GPP). cdma2000 and ultra-mobile broadband (UMB) are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple input multiple output (MIMO) transmissions with precoding may also be supported. MIMO configurations in a downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100, in which aspects of the present disclosure may be performed. For example, the wireless communication network 100 may include one or more base stations (BSs) 110 and/or one or more user equipments (UEs) 120 configured to execute a proximity discovery technique. As shown in FIG. 1, a UE 120a includes a proximity manager 122a that may be configured to perform operations 900 of FIG. 9. A UE 120b includes a proximity manager 122b that may be configured to perform operations 1000 of FIG. 10. A BS 110a includes a proximity manager 112 that may be configured to perform operations 1100 of FIG. 11.

The wireless communication network 100 may be a new radio (NR) system (e.g., a $5^{th}$ generation (5G) NR network). As shown in FIG. 1, the wireless communication network 100 may be in communication with a core network 132. The core network 132 may in communication with one or more BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

The BS 110 may provide communication coverage for a particular geographic area, sometimes referred to as a "cell", which may be stationary or may move according to the location of a mobile BS 110. In some examples, multiple BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. The BS 110 may support one or multiple cells.

The BSs 110 communicate with the UEs 120 in the wireless communication network 100. The UEs 120 (e.g., 120x, 120y, etc.) may be dispersed throughout the wireless communication network 100, and each UE 120 may be stationary or mobile. The wireless communication network 100 may also include relay stations (e.g., a relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between the UEs 120, to facilitate communication between wireless devices.

A network controller 130 may be in communication with a set of BSs 110 and provide coordination and control for these BSs 110 (e.g., via a backhaul). In aspects, the network controller 130 may be in communication with the core network 132 (e.g., a 5G core network (5GC)), which provides various network functions such as access and mobility management, session management, user plane function, policy control function, authentication server function, unified data management, application function, network exposure function, network repository function, network slice selection function, etc.

Figure 2:
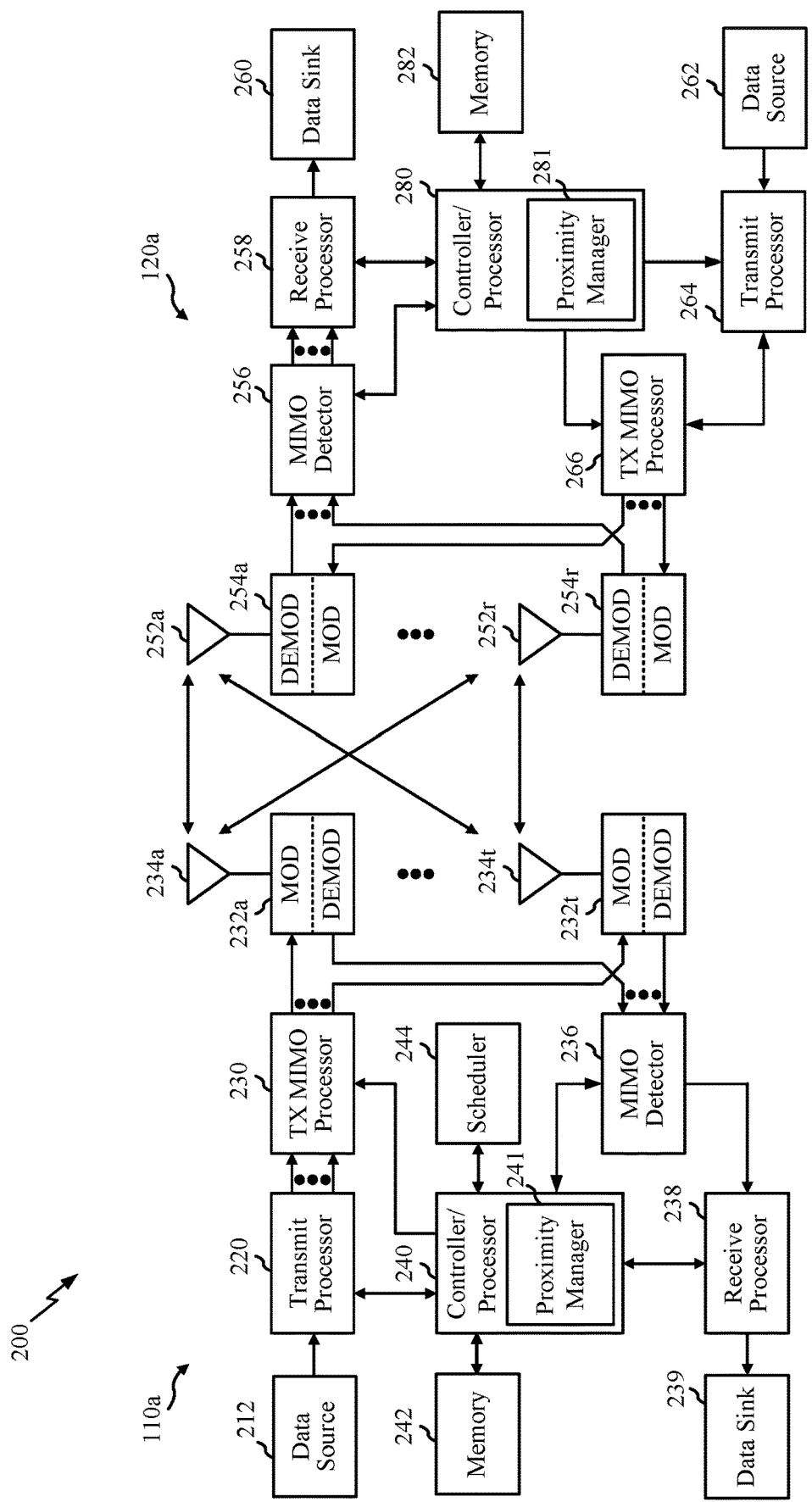
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a proximity manager 241 that may be configured to perform the operations illustrated in FIG. 11, as well as other operations disclosed herein. As shown in FIG. 2, the controller/processor 280 of the UE 120a has a proximity manager 281 that may be configured to perform the operations illustrated in FIG. 9, as well as other operations disclosed herein. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RB s. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
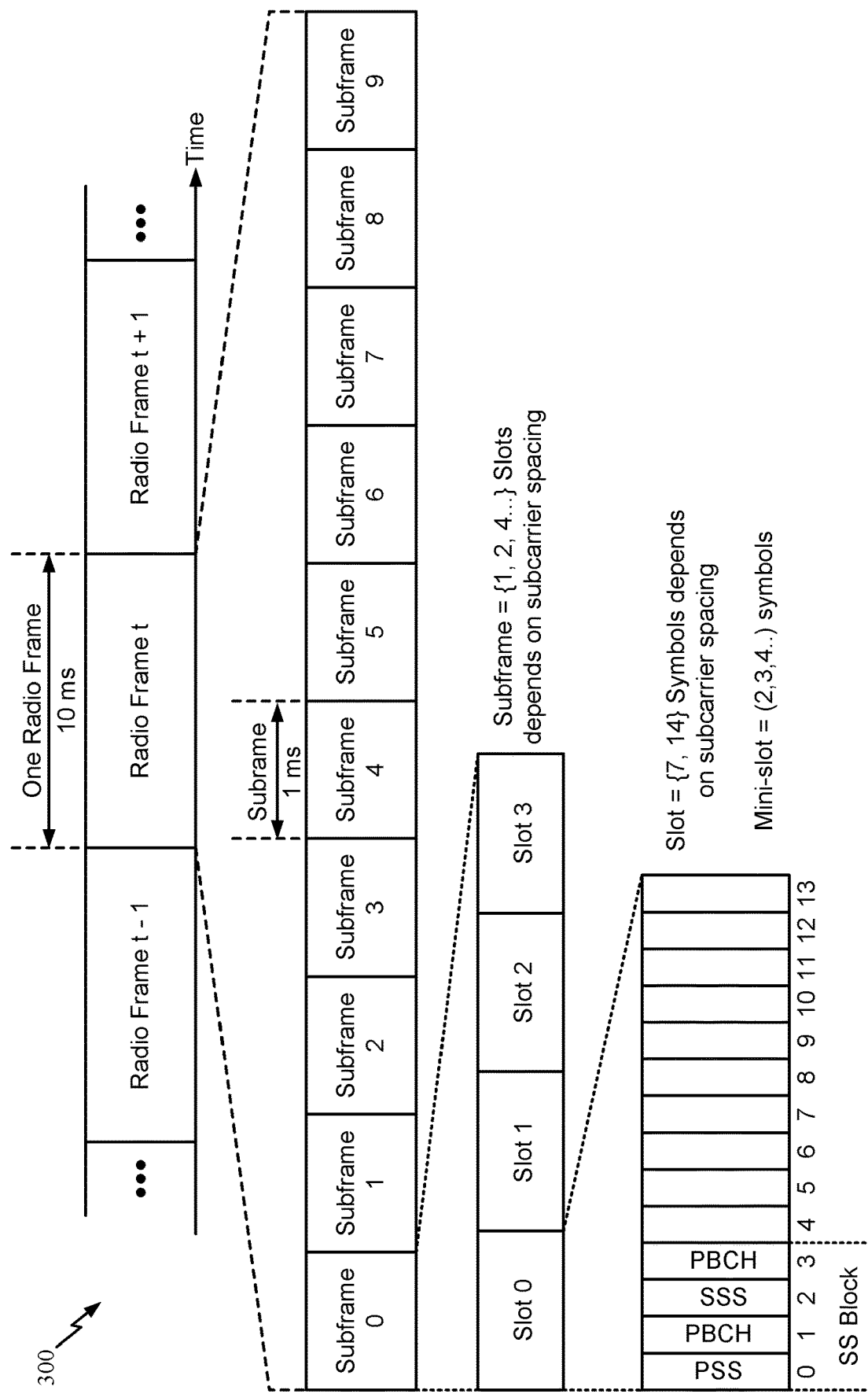
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example Sidelink Communication

Communication between wireless nodes (such as a user equipment (UE) and a base station (BS)) may be referred to as an access link. Communication between multiple UEs may be referred as sidelink. Real-world applications of sidelink communications may include vehicle-to-vehicle (V2V) communications, internet of everything (IoE) communications, etc.

UEs may communicate with each other using sidelink signals. A sidelink signal may refer to a signal communicated from one UE (for example, a transmitter UE) to another UE (for example, a receiver UE) without relaying that communication through the BS, even though the BS may be utilized for scheduling and/or control purposes. The sidelink signals may be communicated using a licensed spectrum (unlike wireless local area networks that may use an unlicensed spectrum). One example of sidelink communication is PC5 as used in V2V communications.

Sidelink channels may be used for sidelink communications. The sidelink channels may include a physical sidelink discovery channel (PSDCH), a physical sidelink control channel (PSCCH), a physical sidelink shared channel (PSSCH), and a physical sidelink feedback channel (PSFCH). The PSDCH may carry discovery expressions, which may enable proximal UEs to discover each other. The PSCCH may carry control signaling such as sidelink resource configurations and other parameters used for data transmissions. The PSSCH may carry data transmissions. The PSFCH may carry feedback such as channel state information (CSI) related to a sidelink channel quality.

Figure 4B:
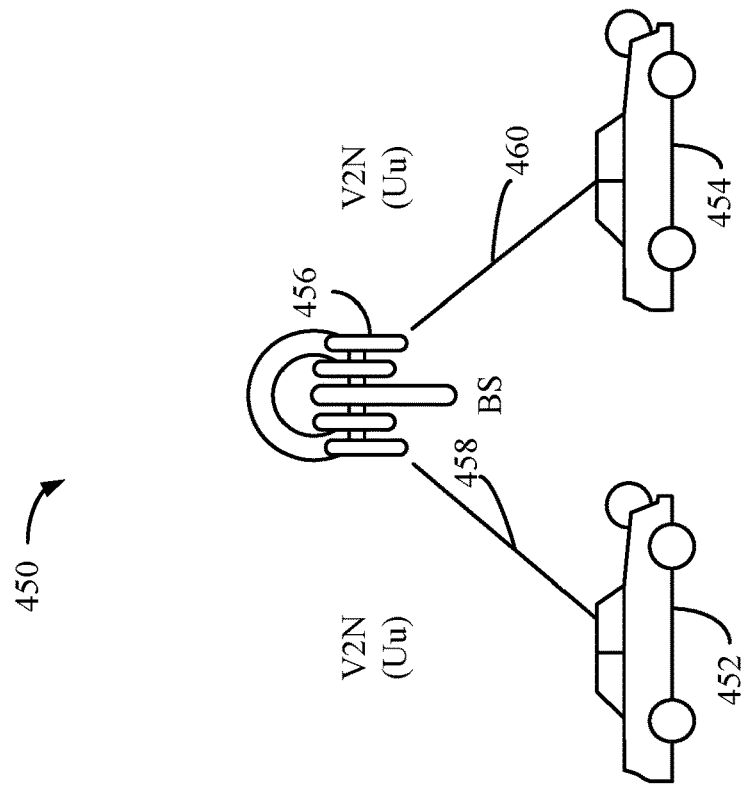
FIG. 4A and FIG. 4B show diagrammatic representations of example vehicle to everything (V2X) systems, in accordance with certain aspects of the present disclosure.
Figure 4A:
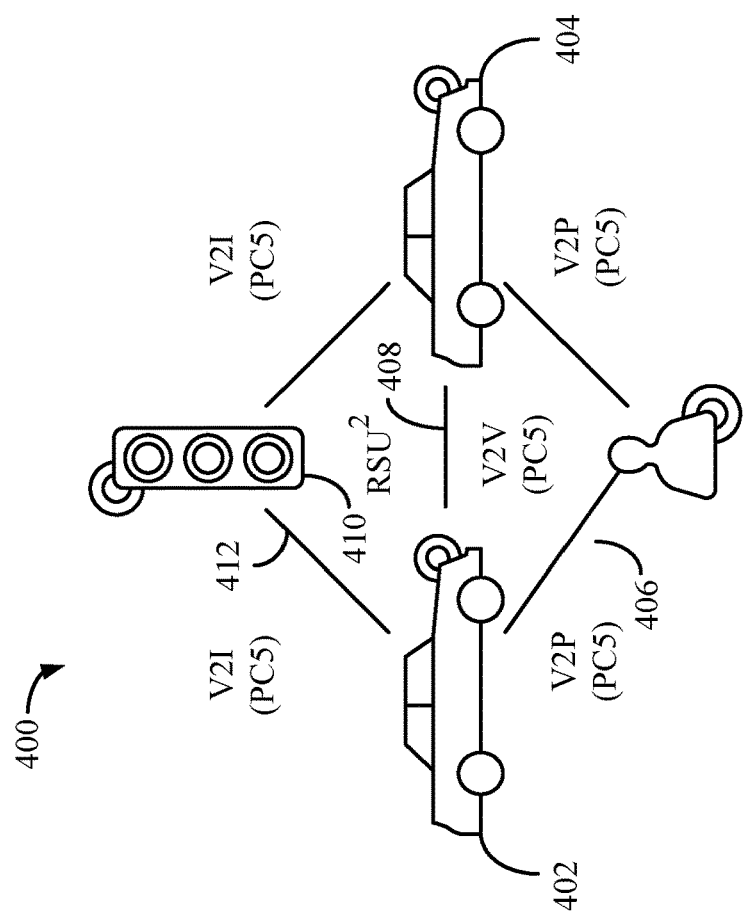

FIG. 4A and FIG. 4B show diagrammatic representations of example vehicle to everything (V2X) systems. Vehicles shown in these V2X systems may communicate via sidelink channels.

The V2X systems in FIG. 4A and FIG. 4B provide two complementary transmission modes. A first transmission mode, shown by way of example in FIG. 4A, involves direct communications (for example, also referred to as sidelink communications) between vehicles in proximity to one another in a local area. A second transmission mode, shown by way of example in FIG. 4B, involves network communications through a network, which may be implemented over a Uu interface (for example, a wireless communication interface between a radio access network (RAN) and a vehicle).

Referring to FIG. 4A, a V2X system 400 (including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, a highway component 410), such as a traffic signal or sign (vehicle-to-infrastructure (V2I)) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., such as the BS 110a of FIG. 1 or FIG. 2), that sends and receives information to and from (for example, relays information between) the vehicles 452, 454. The network communications through vehicle to network (V2N) links 458 and 460 may be used, for example, for long range communications between the vehicles 452, 454, such as for communicating the presence of a car accident a distance ahead along a road or highway. Other types of communications may be sent by the BS to the vehicles 452, 454, such as traffic flow conditions, road hazard warnings, environmental/weather reports, and service station availability, among other examples. Such data can be obtained from cloud-based sharing services.

Example New Radio Sidelink Channel Access Modes

A vehicle to everything (V2X) system for communication between user equipments (UEs) (e.g., vehicles) may be for delivering sparse and/or sporadic intelligent transport system (ITS) messages. The V2X system may operate in multiple channel access modes. The channel access modes may include a Mode 1 and a Mode 2.

In the Mode 1, the V2X system may be for in-coverage area deployment where a sidelink transmitter UE may receive a grant for a sidelink channel access. In this mode, the V2X system may accomplish higher spectral efficiency (due to centralized scheduling) and more power saving.

In the Mode 2, the V2X system may be for autonomous deployment where a sidelink transmitter UE may conduct sensing based distributed sidelink channel access. In this mode, the sidelink transmitter UE may conduct continuous sensing to suppress collision.

The sidelink communications may be applicable in several vertical domains. However, not every vertical domain may have a highly dynamic network topology as the V2X system. Also, some of these vertical domains may carry significantly different traffic in comparison to the V2X system. Furthermore, not every vertical domain may obtain a licensed spectrum as done by the V2X system.

The sidelink communications over an unlicensed band may be applicable as a work item. In an unlicensed band (e.g., 5 GHz/6 GHz band), a listen before talk (LBT) may be imposed by a regulator for co-existence with other radio access technologies (RATs). However, LBT rules therein may not be responsive towards a sidelink channel access.

In the sidelink, a channel access timing may be defined according to a common clock. The LBT (in the 5 GHz/6 GHz band) may be optimized for asynchronous channel access (such as Wi-Fi that may occupy a channel immediately after a LBT success). Accordingly, the sidelink may be at a worse position in a competing channel access with other RATs. To address this problem, one remedy may be to share channel occupancy time (COT) among the sidelink UEs.

Figure 5:
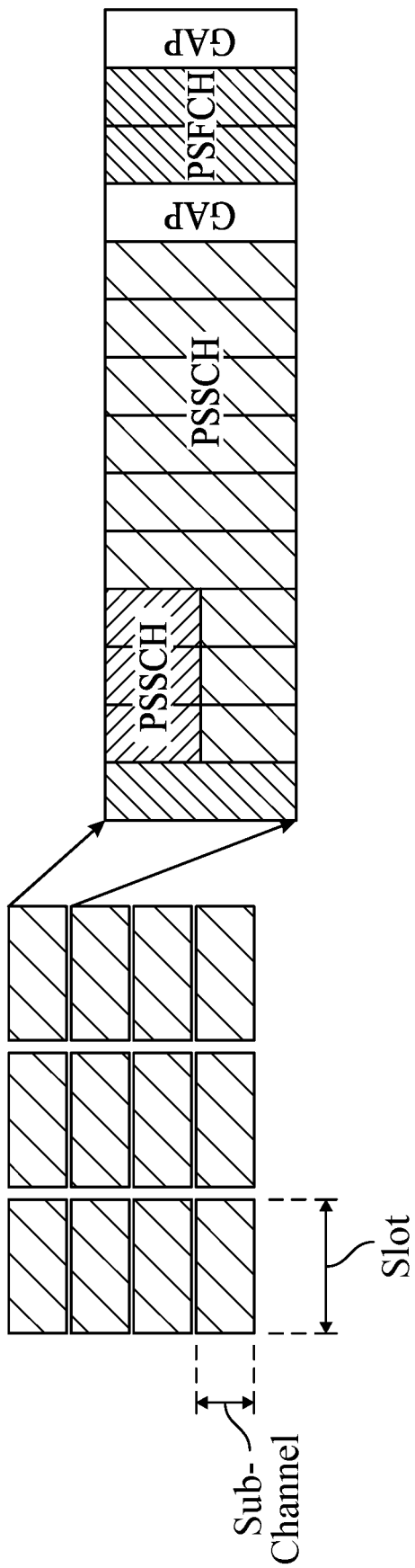
FIG. 5 shows an example slot in a radio frame, in accordance with certain aspects of the present disclosure.

As illustrated in FIG. 5, each sidelink slot may include a physical sidelink shared channel (PSSCH), a physical sidelink feedback channel (PSFCH), and gap(s) to facilitate transmit/receive switching, which may be leveraged as a common silence interval to ease simultaneous LBTs for orthogonal frequency-division multiple access (OFDMA) sidelink UEs. However, this may be against a concept of COT developed for high-efficiency channel access with the LBT. Accordingly, to have an appropriate spectral efficiency, the sidelink may need to determine a technique to arrange COT-aware consecutive transmissions without blocking other transmissions.

Figure 6:
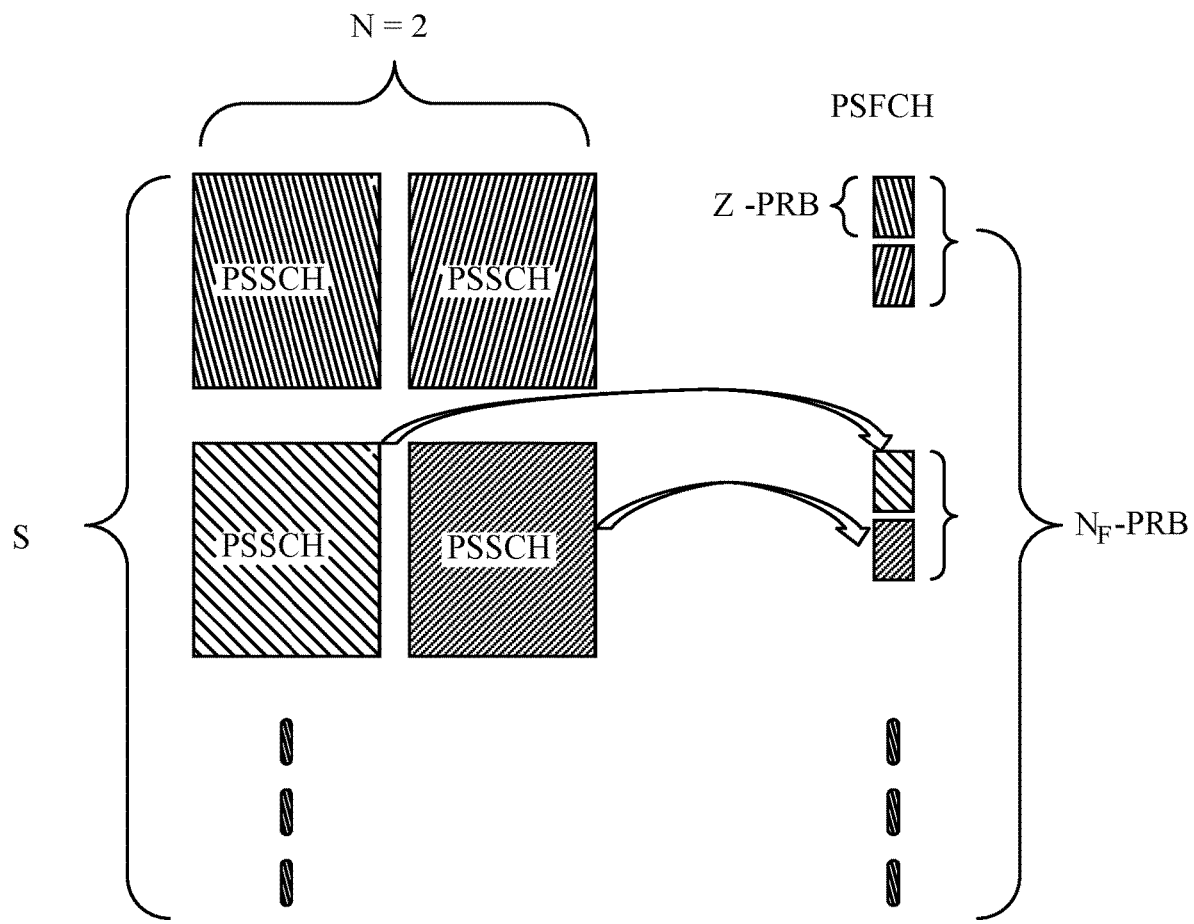
FIG. 6 shows example mapping of physical sidelink shared channels (PSSCHs) to a physical sidelink feedback channel (PSFCH) resources, in accordance with certain aspects of the present disclosure.

As illustrated in FIG. 6, a PSFCH pool (indicated by a physical resource blocks (PRB) level bit map) may include $N_F=Z*S*N$ PRB s. Each PSSCH may be mapped to Z-PRB in a PSFCH symbol. Each Z-PRB may carry $Z*Y$ PSFCH sequences where Y is within {1,2,3,4,6} and representing a number of cyclic shifts (i.e., a dimension in a code domain).

A sidelink receiver UE may select a sequence whose index is $(K+M) \mod (Z*Y)$ for transmitting one of the Z-PRB corresponding to a (leading) subchannel of the PSSCH. K is a transmitter UE ID (8-bit) in the PSSCH. M is set to 0 for unicast, and to a group ID for groupcast HARQ response option 2. RAN1 may assume that the group ID is within {0,1, . . . X−1}. The groupcast HARQ response option 2 (i.e., respective response for different sidelink receiver UEs) may not be used for $X>(Z*Y)$.

Figure 7:
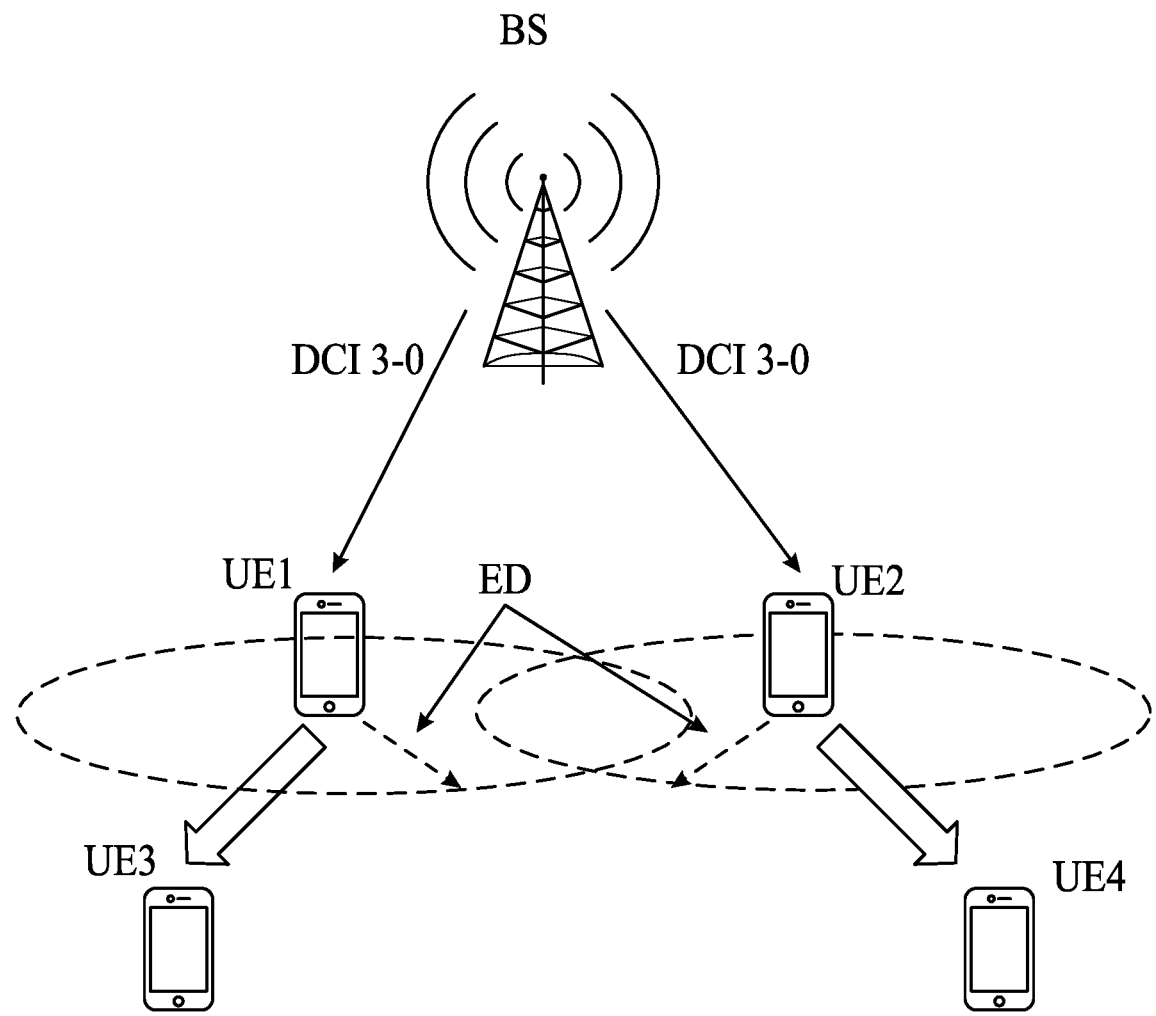
FIG. 7 shows an example sidelink deployment scenario, in accordance with certain aspects of the present disclosure.

As illustrated in FIG. 7, in a Mode 1, a BS may send a downlink control information (DCI) to sidelink transmitter UEs (such as a UE1 and a UE2) to arrange transmissions over a sidelink. The DCI may include a sidelink resource grant, which may be blindly issued. Accordingly, the BS may not know about a channel state information (CSI) over sidelink links (since it is up to a sidelink transmitter UE to determine how to use the granted resource), and may only allocate orthogonal resources to concurrent sidelink links. In some cases, the sidelink transmitter UE may include sidelink CSI reference signal (CSI-RS) and may request a CSI feedback from a sidelink receiver UE, yet a medium access control-control element (MAC-CE) carrying the CSI may be terminated at the sidelink transmitter UE.

When the BS may not know about inter-UE CSI, it may lead to invalid DCI for Mode 1 over an unlicensed band. For example, the BS may issue resource grants to two sidelink transmitter UEs (i.e., the UE1 and the UE2) that may have conflicted LBT attempts. Accordingly, spectral efficiency may be compromised and more complicated protocols over Uu for scheduling and/or hybrid automatic repeat request (HARQ) management may be needed.

Example Sidelink Jamming Graph

Figure 8:
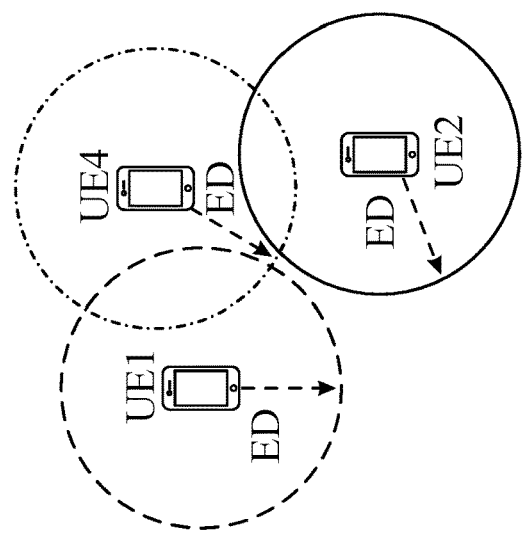
FIG. 8 shows an example sidelink jamming graph, in accordance with certain aspects of the present disclosure.
Figure 8:
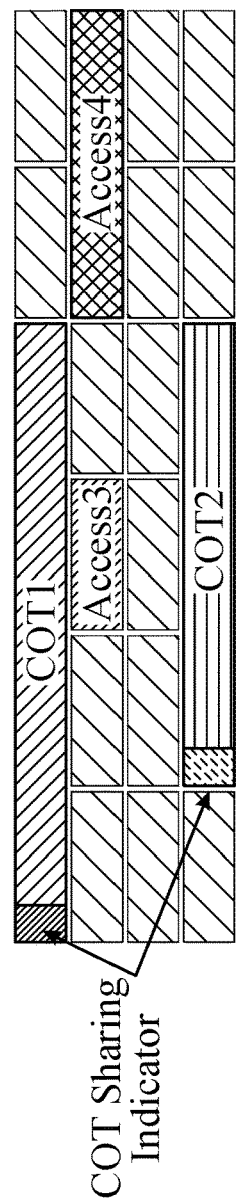

A base station (BS) may use information associated with a sidelink jamming graph to schedule concurrent and/or adjacent sidelink transmitter UEs. For example, based on the sidelink jamming graph (as shown in FIG. 8), the BS may determine that a UE1 and a UE2 may be separated from each other in a radio frequency (RF) distance (i.e., no listen-before-talk (LBT) blocking). The BS may further determine that a type 1 LBT attempt of a UE4 may be blocked when either the UE1 or the UE2 may be transmitting. Accordingly, the BS may generate and send a downlink control information (DCI) to grant the UE1 to initiate channel occupancy time 1 (COT1) and the UE2 to initiate COT2 in parallel, while to grant the UE4 to conduct a type 2 LBT (instead of the type 1 LBT) to use access 4 in a COT-sharing way.

A BS may obtain a sidelink jamming graph via a passive scan at sidelink UEs. For example, each sidelink UE may be configured to decode a received sidelink control information (SCI) from other sidelink UEs. The SCI may include an 8-bit L1 source ID. The SCI may include a L2 source ID that may be obtained when a medium access control (MAC) protocol data units (PDU) is decoded. After the decoding, each sidelink UE may determine a set of other sidelink UEs that may be within its proximity by measuring a demodulation reference signal (DMRS) reference signal received power (RSRP). The BS may collect a report from each sidelink UE, which may indicate this determined proximity information. By collecting reports from the sidelink UEs, the BS may generate the sidelink jamming graph.

A BS may find it challenging to generate a complete sidelink jamming graph that may include proximity information about all UEs within a short scanning interval. This is because there may be a set of proximity UEs that may have not been scheduled in this short scanning interval, and information associated with this set of proximity UEs may not be included in the sidelink jamming graph. Also, it may not be each time possible to parse a MAC PDU as it may consume a significant amount of power.

Alternatively, a BS may approximate a sidelink jamming graph with Uu based one. For example, the BS may arrange cross-link interference (CLI) measurement (for flexible time division duplex (TDD) among a set of Mode 1 sidelink UEs to generate the sidelink jamming graph. However, the approximation of the sidelink jamming graph may be inaccurate when sidelink and uplink (UL) are on respective bands. In addition, it may not be easy to make an appropriate trade-off between a prompt CLI measurement and a signaling overhead.

Example Proximity Discovery for New Radio Sidelink Mode 1

Aspects of the present disclosure relate to an improved proximity discovery technique to generate and enable a sidelink jamming graph representing a proximity between multiple sidelink user equipments (UEs). A base station (BS) may use information associated with the sidelink jamming graph to schedule the UEs. The proximity discovery technique described herein may improve sidelink Mode 1 channel access that may help to avoid listen before talk (LBT) blocking when deployed in an unlicensed band.

Figure 9:
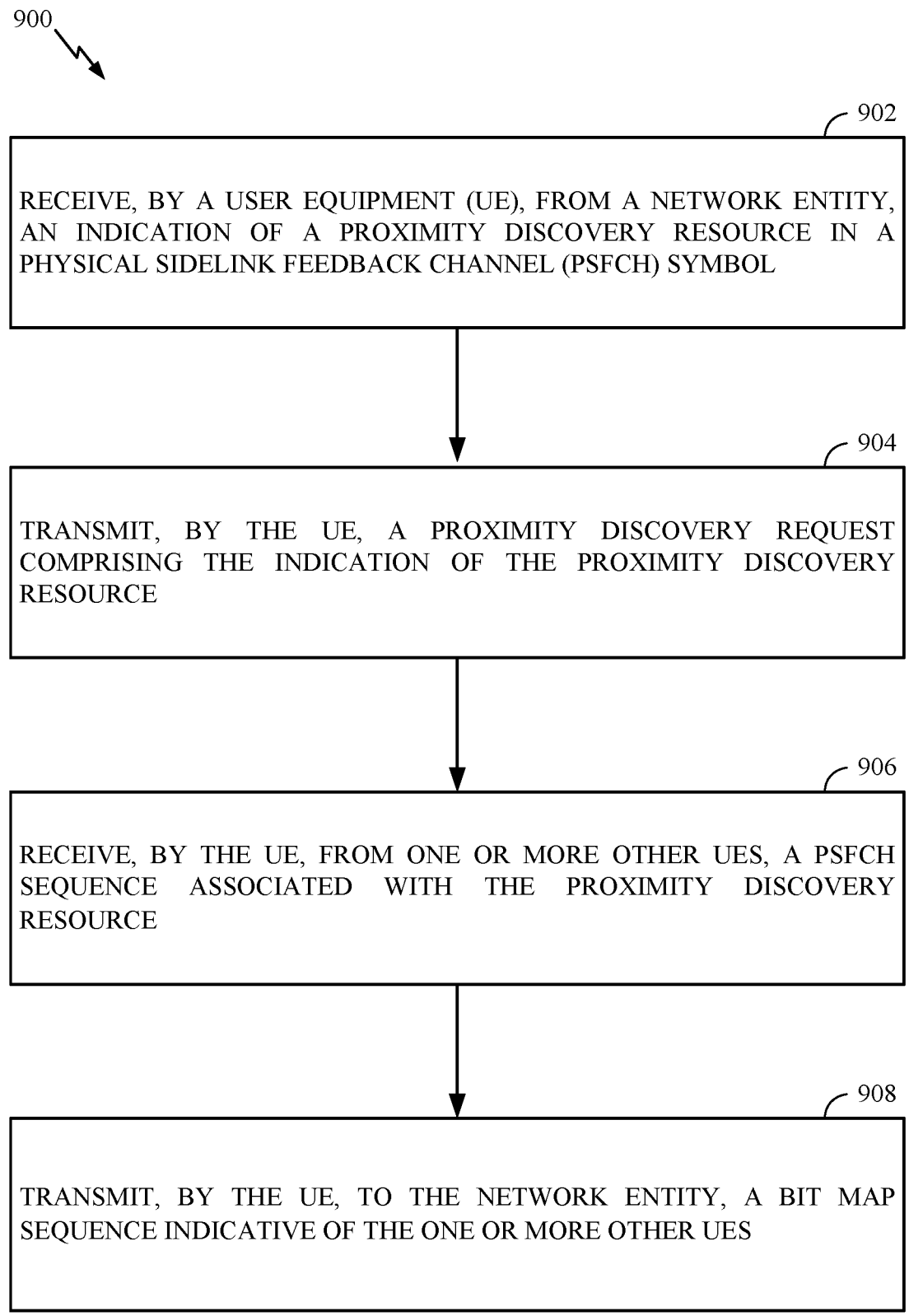
FIG. 9 is a flow diagram illustrating example operations for wireless communication by a UE, in accordance with certain aspects of the present disclosure.

FIG. 9 is a flow diagram illustrating example operations 900 for wireless communication, in accordance with certain aspects of the present disclosure. The operations 900 may be performed, for example, by a UE (e.g., such as the UE 120a in the wireless communication network 100 of FIG. 1). The operations 900 may be implemented as software components that are executed and run on one or more processors (e.g., the controller/processor 280 of FIG. 2). Further, transmission and reception of signals by the UE in operations 900 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 900 begin, at 902, by receiving, from a network entity, an indication of a proximity discovery resource in a physical sidelink feedback channel (PSFCH) symbol. The UE receives the indication using antenna(s) and transmitter/transceiver components of the UE 120a shown in FIG. 1 or FIG. 2 and/or of the apparatus shown in FIG. 17.

At 904, the UE transmits a proximity discovery request including the indication of the proximity discovery resource. The UE transmits the proximity discovery request using antenna(s) and transmitter/transceiver components of the UE 120a shown in FIG. 1 or FIG. 2 and/or of the apparatus shown in FIG. 17.

At 906, the UE receives from one or more other UEs a PSFCH sequence associated with the proximity discovery resource. The UE receives the PSFCH sequence using antenna(s) and transmitter/transceiver components of the UE 120a shown in FIG. 1 or FIG. 2 and/or of the apparatus shown in FIG. 17.

At 908, the UE transmits to the network entity a bit map sequence indicative of the one or more other UEs. The UE transmits the bit map sequence using antenna(s) and transmitter/transceiver components of the UE 120a shown in FIG. 1 or FIG. 2 and/or of the apparatus shown in FIG. 17.

Figure 10:
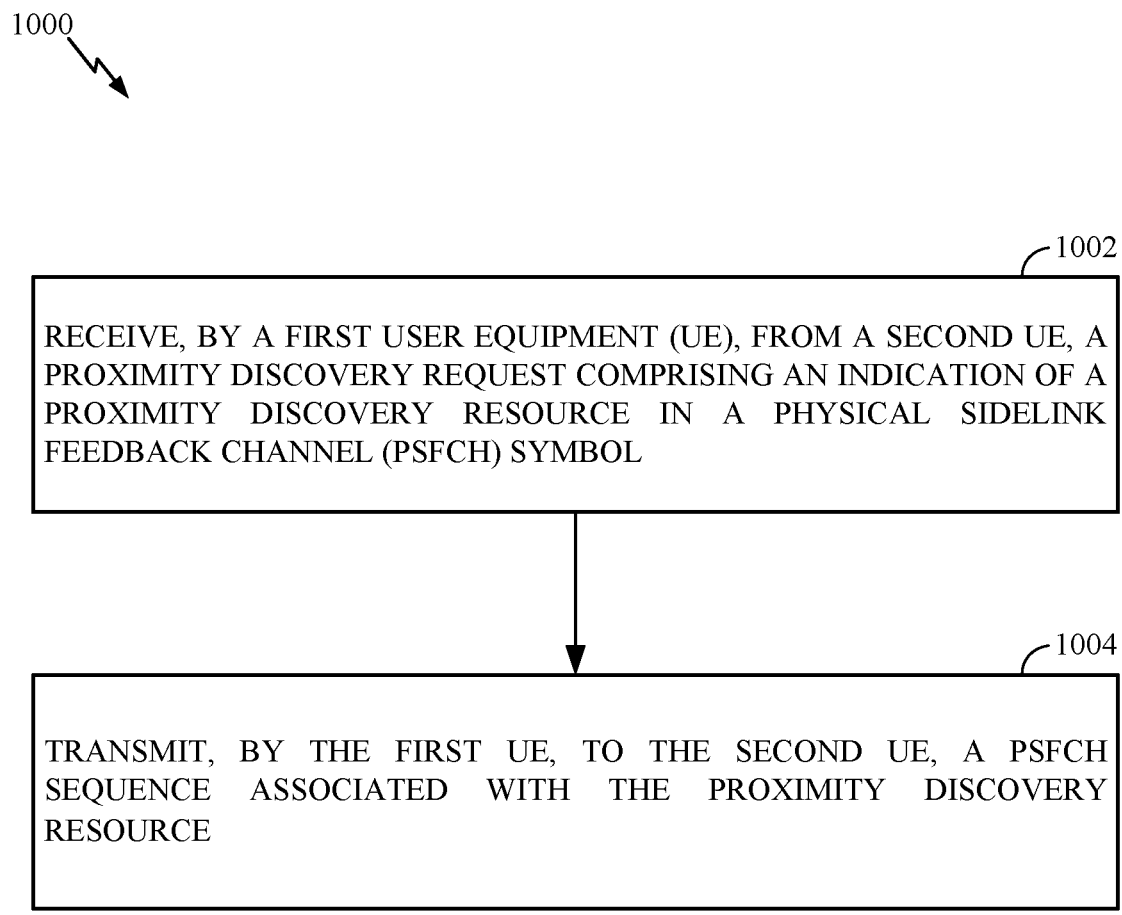
FIG. 10 is a flow diagram illustrating example operations for wireless communication by a first UE, in accordance with certain aspects of the present disclosure.

FIG. 10 is a flow diagram illustrating example operations 1000 for wireless communication, in accordance with certain aspects of the present disclosure. The operations 1000 may be performed, for example, by a first UE (e.g., such as the UE 120a in the wireless communication network 100 of FIG. 1) acting as one of the "other" UEs in step 906 that sends a PSFCH sequence associated with a proximity discovery resource. The operations 1000 may be implemented as software components that are executed and run on one or more processors (e.g., the controller/processor 280 of FIG. 2). Further, transmission and reception of signals by the first UE in operations 1000 may be enabled, for example, by one or more antennas (e.g., the antennas 252 of FIG. 2). In certain aspects, the transmission and/or reception of signals by the first UE may be implemented via a bus interface of one or more processors (e.g., the controller/processor 280) obtaining and/or outputting signals.

The operations 1000 begin, at 1002, by receiving from a second UE a proximity discovery request comprising an indication of a proximity discovery resource in a PSFCH symbol. The first UE receives the proximity discovery request using antenna(s) and transmitter/transceiver components of the UE 120a shown in FIG. 1 or FIG. 2 and/or of the apparatus shown in FIG. 18.

At 1004, the first UE transmits to the second UE a PSFCH sequence associated with the proximity discovery resource. The first UE transmits the PSFCH sequence using antenna(s) and transmitter/transceiver components of the UE 120a shown in FIG. 1 or FIG. 2 and/or of the apparatus shown in FIG. 18.

Figure 11:
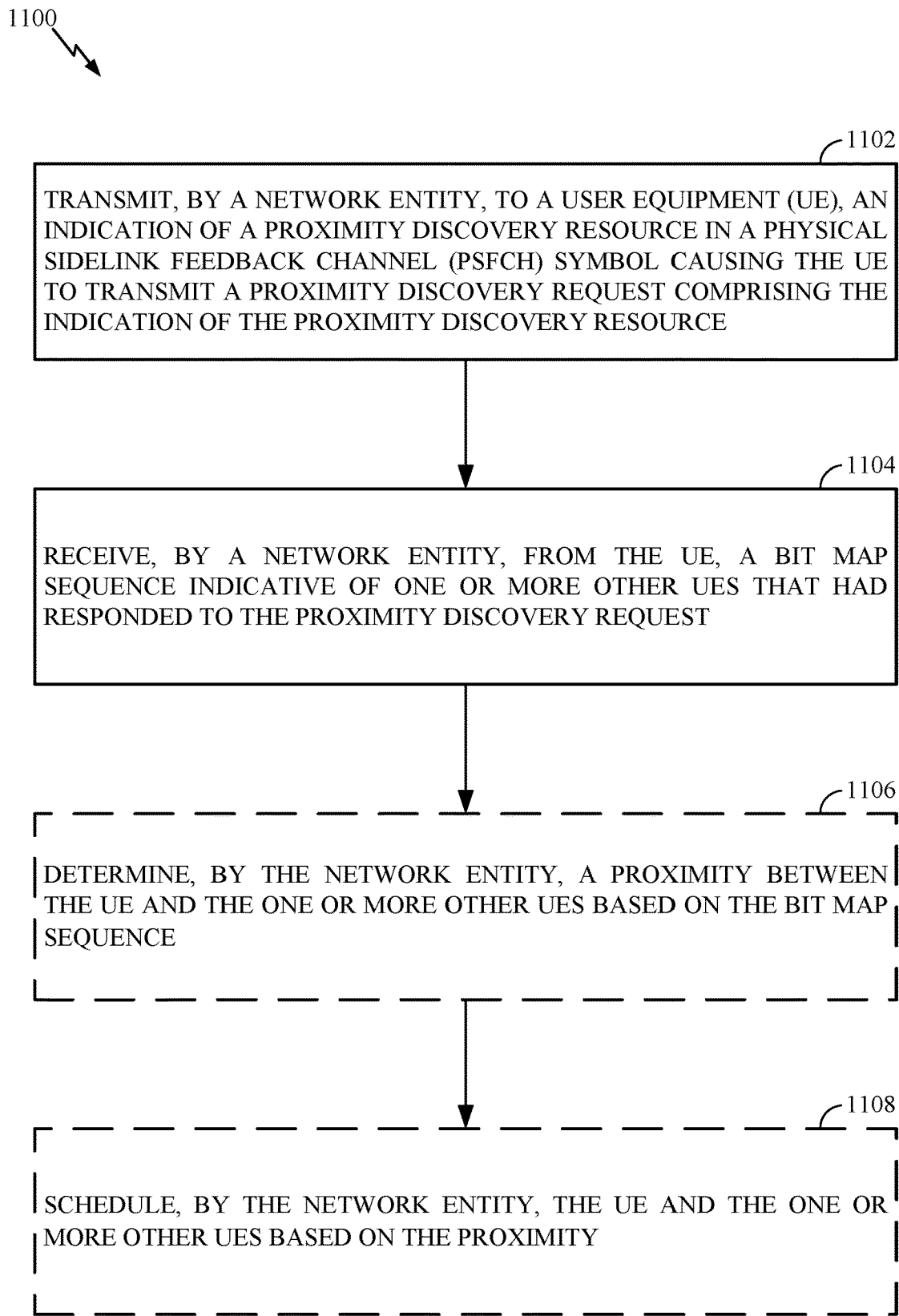
FIG. 11 is a flow diagram illustrating example operations for wireless communication by a network entity, in accordance with certain aspects of the present disclosure.

FIG. 11 is a flow diagram illustrating example operations 1100 for wireless communication, in accordance with certain aspects of the present disclosure. The operations 1100 may be performed, for example, by a network entity (e.g., such as the BS 110a in the wireless communication network 100 of FIG. 1) that configures a UE with resources to perform operations 900 of FIG. 9. The operations 1100 may be implemented as software components that are executed and run on one or more processors (e.g., the controller/processor 240 of FIG. 2). Further, transmission and reception of signals by the network entity in operations 1100 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 1100 begin, at block 1102, by transmitting to a UE an indication of a proximity discovery resource in a PSFCH symbol causing the UE to transmit a proximity discovery request including the indication of the proximity discovery resource. The network entity transmits the indication using antenna(s) and transmitter/transceiver components of the BS 110a shown in FIG. 1 or FIG. 2 and/or of the apparatus shown in FIG. 19.

At 1104, the network entity receives from the UE a bit map sequence indicative of one or more other UEs that had responded to the proximity discovery request. The network entity receives the bit map sequence using antenna(s) and transmitter/transceiver components of the BS 110a shown in FIG. 1 or FIG. 2 and/or of the apparatus shown in FIG. 19.

At 1106, the network entity determines a proximity between the UE and the one or more other UEs based on the bit map sequence. The network entity determines the proximity between the UE and the one or more other UEs using a processor of the BS 110a shown in FIG. 1 or FIG. 2 and/or of the apparatus shown in FIG. 19.

At 1108, the network entity schedules the UE and the one or more other UEs based on the proximity. The network entity schedules the UE and the one or more other UEs using a processor of the BS 110a shown in FIG. 1 or FIG. 2 and/or of the apparatus shown in FIG. 19.

Operations 900, 1000, and 1100 shown in FIGS. 9, 10, and 11 are further described with reference to FIGS. 12-16.

Figure 12:
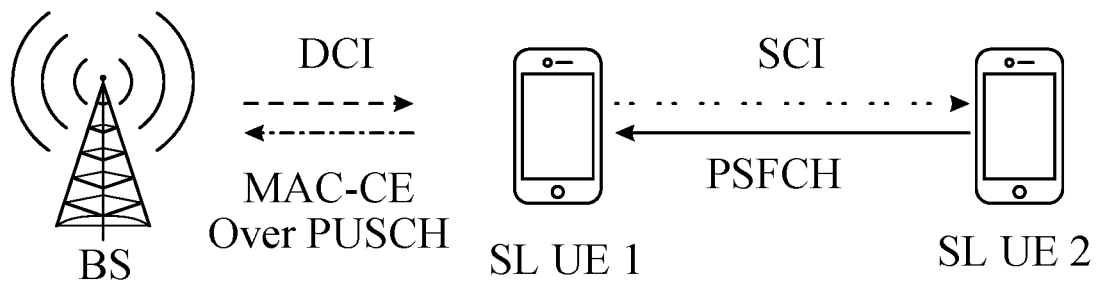
FIG. 12 shows an example sidelink deployment scenario, in accordance with certain aspects of the present disclosure.

As illustrated in FIG. 12, a BS (performing operations 1100 of FIG. 11, a first UE (or a UE 1 performing operation 900 of FIG. 9), and a second UE (or a UE 2 performing operations 1000 of FIG. 10) may communicate with each other.

In certain aspects, the BS may transmit a downlink control information (DCI) to the first UE, which may indicate to the first UE to implement a proximity discovery technique to conduct proximity discovery of other nearby UEs (e.g., the second UE). The DCI may include an indication of a proximity discovery resource in a PSFCH symbol. The DCI may grant an array of physical resource blocks (PRB s) in the PSFCH symbol as the proximity discovery resource. The array of the PRBs may be used by UEs to convey sequences associated with metric defining proximity.

In certain aspects, the DCI may be standalone and only include the indication of the proximity discovery resource in the PSFCH symbol. In certain aspects, the DCI may include the indication to proximity related codepoints along with a grant for a data transmission over a physical sidelink shared channel (PSSCH). In certain aspects, the DCI may include an identification (ID). In certain aspects, the DCI may include a reference signal received power (RSRP) threshold, which may define proximity (e.g., UE2 may only send a sequence indicating its proximity if it measures RSRP on an SCI broadcast from UE1). In certain aspects, the DCI may include a specified random seed. In certain aspects, to promptly collect proximity discovery results (i.e., a bit map sequence generated by the first UE), the DCI may include a physical uplink shared channel (PUSCH) resource for carrying a media access control (MAC)— control element (CE). In certain aspects, the DCI may include a transmit precoding configuration, which may be used by the first UE to transmit a proximity discovery request.

In certain aspects, the first UE may receive the DCI from the BS. The first UE may generate a sidelink control information (SCI) using information received in the DCI. The first UE may transmit the SCI (e.g., broadcast the SCI for detection by other UEs). The SCI may include (or effectively serve as) a proximity discovery request, which may include the indication of the proximity discovery resource in the PSFCH symbol. In certain aspects, the SCI may include the ID. In certain aspects, the SCI may include the RSRP threshold. In certain aspects, the SCI may include the specified random seed.

In certain aspects, the second UE (along with some other nearby UEs) may receive the SCI, which may include the proximity discovery request, the ID, the RSRP threshold, and/or the specified random seed. Upon receiving the SCI, the second UE may determine whether the second UE is in proximity to the first UE. When the second UE is in proximity with the first UE, the second UE may compute its index into the proximity discovery resource in the PSFCH symbol from a hashing function on its sidelink radio network temporary identifier (SL-RNTI), and then send a PSFCH sequence associated with the proximity discovery resource to the first UE in a location based on its computed index.

In certain aspects, the first UE may generate a bit map sequence indicating information received over the proximity discovery resource from the second UE (and other UEs). For example, the bit map sequence may be indicative of the second UE (and other UEs) that had responded to the proximity discovery request. The first UE may transmit a proximity discovery result (e.g., the bit map sequence) as a MAC-CE to the BS.

In certain aspects, the first UE prior to finalizing and transmitting the bit map sequence to the BS (or after receiving the PSFCH sequences from one or more other UEs) may determine an energy level on the corresponding PSFCH resource block from each responding UE. When the energy level is within a range corresponding to the RSRP threshold, the first UE may validate the PSFCH sequence in the proximity discovery resource and generate the bit map sequence indicative of the second UE (and other UEs). When the energy level is not within the range corresponding to the RSRP threshold (though strong enough to be detected), the first UE may set a bit to a particular value (e.g., "0") in the bit map sequence.

After receiving the bit map sequence, the BS may determine a proximity between the first UE and other UEs (e.g., the second UE) based on the bit map sequence. The BS may use the bit map sequence to decide which set of SL-RNTIs associated with the other UEs (e.g., the second UE) are in the proximity with the first UE. The BS may generate a sidelink jamming graph, which may indicate information such as the proximity between the first UE and other UEs (e.g., the second UE). The BS may schedule the first UE and/or the other UEs (e.g., the second UE) based on information associated with the sidelink jamming graph. In certain aspects, the BS may schedule concurrent sidelink transmissions for deployment in a licensed spectrum based on the information associated with the sidelink jamming graph. In certain aspects, the BS may arrange spatial reuse over two in-parallel sidelink links when the BS may determine that two pairs of UEs may be appropriately separated in a radio frequency (RF) distance based on the information associated with the sidelink jamming graph.

In certain aspects, after receiving a SCI from a first UE, a second UE may parse an ID within the SCI. Based on the parsing, the second UE may determine whether the SCI was transmitted by the first UE using a valid SL-RNTI.

In certain aspects, the second UE may implement multiple techniques to determine whether the first UE transmitted the SCI using the valid SL-RNTI. In one technique, when the ID may be a physical cell ID (PCI), the second UE may determine that the SL-RNTI is valid when the second UE may have a SL-RNTI assigned by the BS with the same PCI. In another technique, when the ID may be an operator ID, the second UE may determine the SL-RNTI is valid when the second UE and the BS may be associated with the same operator ID. This may indicate that there may be an intra-operator coordination on SL-RNTI allocation among nearby BSs. In yet another technique, the second UE may obtain a set, which may be predefined via a system information block (SIB) or a radio resource control (RRC). The second UE may determine whether the ID is in the set. When the ID is within the set, the second UE may determine that the SL-RNTI is valid. This may indicate that nearby BSs (same operator or different operators) may coordinate in SL-RNTI allocation to UEs.

Figure 13:
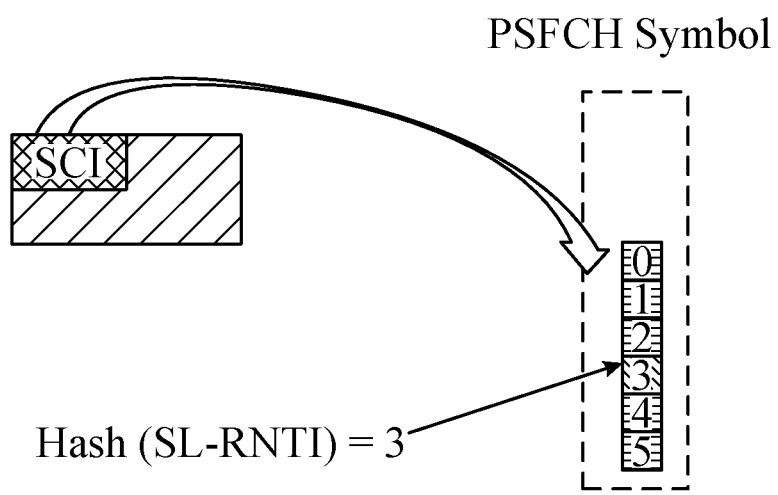
FIG. 13 shows an example sidelink control information (SCI) and PSFCH symbol, in accordance with certain aspects of the present disclosure.

In certain aspects, if the second UE determines that the first UE did not transmit the SCI using the valid SL-RNTI, the second UE may skip the proximity discovery request. On the other hand, if the second UE determines that the first UE transmitted the SCI using the valid SL-RNTI, the second UE may determine an RSRP from a demodulation reference signal (DMRS) of the first UE. When the RSRP is less than the RSRP threshold, the second UE may skip the proximity discovery request. When the RSRP is equal to or more the RSRP threshold, the second UE may compute an index in the proximity discovery resource using a hashed value of the SL-RNTI (as illustrated in FIG. 13). In certain aspects, the second UE may be configured with a hash function (to calculate the hash value) when the second UE may establish a Uu radio resource control (RRC) connection with the BS. The second UE may transmit the PSFCH sequence (e.g., one PRB sequence at a computed PRB), which may indicate the index in the proximity discovery resource to the first UE.

Figure 14:
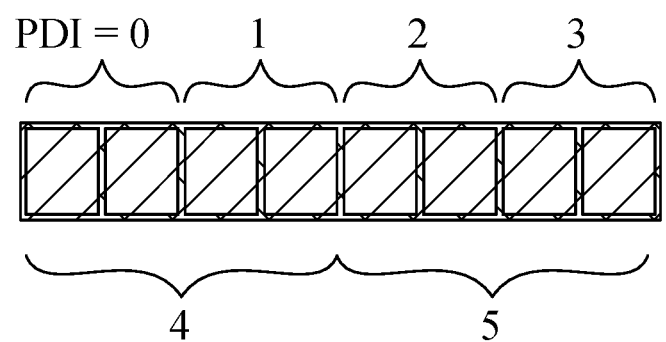
FIG. 14 shows an example proximity discovery indices (PDI), in accordance with certain aspects of the present disclosure.

In certain aspects, a BS may collect all PRBs that are not used by hybrid automatic repeat request (HARQ) responses in a PSFCH symbol in a static discovery resource pool. The BS may define proximity discovery indices (PDIs) for respective proximity discovery resources (e.g., the PRBs) in the static discovery resource pool. In certain aspects, when there may be a large number of the PRBs per sub-channel, there may be the large number of the PRBs in the PSFCH symbol for proximity discovery. In certain aspects, an arrangement of the static discovery resource pool and mapping from the PDIs to the proximity discovery resources may be configured using L3 signaling (e.g., a SIB or a dedicated RRC). Accordingly, the indication of the proximity discovery resources in the PSFCH symbol may be the PDIs. In one non-limiting example, the proximity discovery resources and the PDIs may be defined with a nested structure as shown in FIG. 14.

In certain aspects, a BS may dynamically define a proximity discovery resource in a PSFCH symbol to include some sequence opportunities that may have been arranged by L3 signaling for a HARQ response. In such a case, the proximity discovery resource may be defined as a bit-map such as used in L3 signaling to define a pool of PSFCH HARQ resources. In certain aspects, the BS may avoid scheduling any physical sidelink shared channel (PSSCH) whose PSFCH HARQ opportunity may collide with the proximity discovery resource indicated in the PSFCH symbol.

Figure 15:
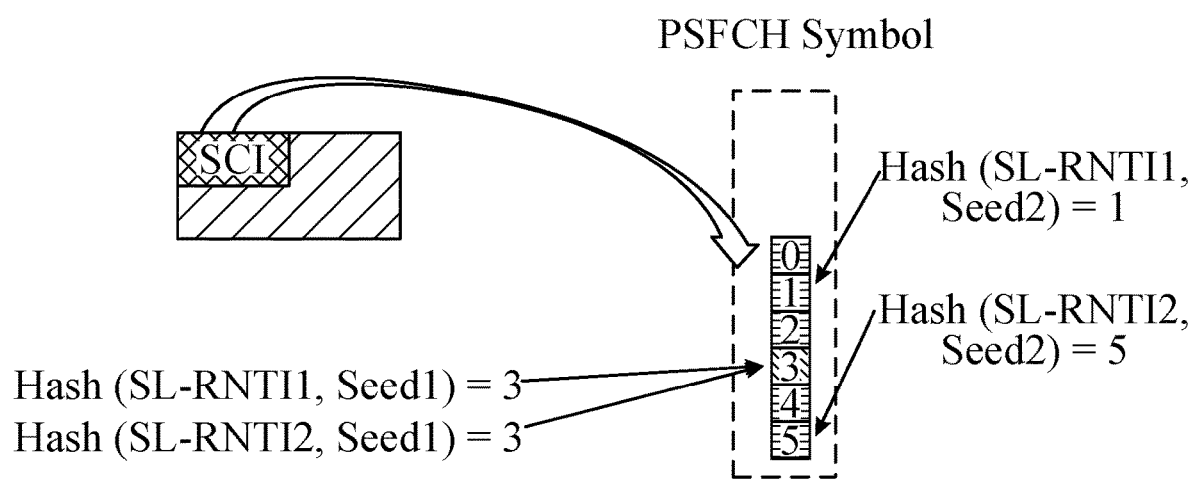
FIG. 15 shows an example SCI and PSFCH symbol, in accordance with certain aspects of the present disclosure.

In certain aspects, as illustrated in FIG. 15, a second UE may receive a hash function from the BS. The hash function may include a specified random seed (or a default random seed). The hash values of two RNTIs may collide with one random seed, but not with another random seed (e.g., due to random seed diversity). Also, the second UE may receive a specified random seed in a SCI from a first UE. The second UE may use this specified random seed to compute an index in the proximity discovery resource. In certain aspects, when there is no specified random seed available, the second UE may then use the default random seed to compute the index in the proximity discovery resource.

Figure 16:
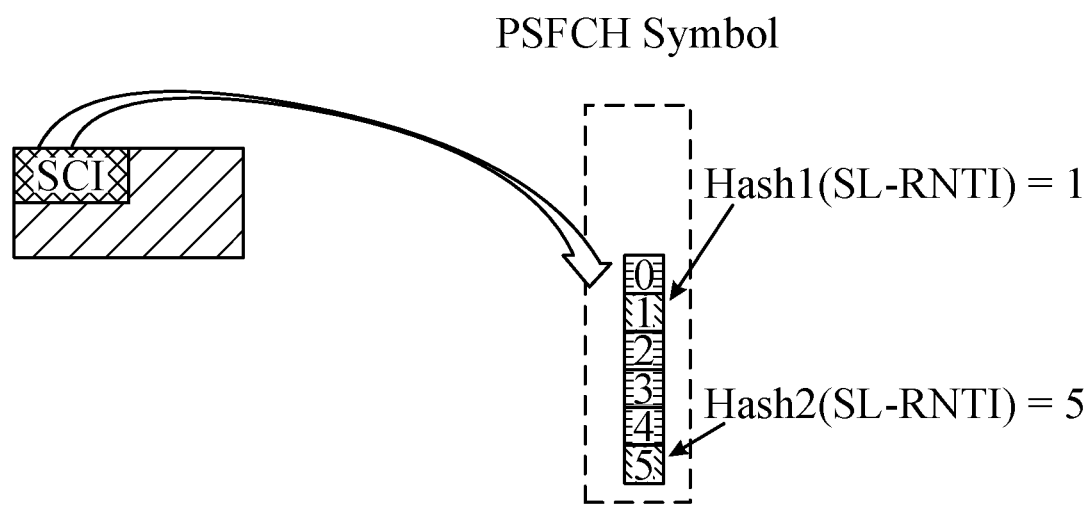
FIG. 16 shows an example SCI and PSFCH symbol, in accordance with certain aspects of the present disclosure.

In certain aspects, performance of a proximity discovery technique may be enhanced by assigning more than one hash function (i.e., resorting to a bloom filter) to a second UE. In certain aspects, there may be an optimum number of hash functions for a given number of proximity UEs, a given number of proximity discovery resources, and a required false alarm. As illustrated in FIG. 16, a BS may assign two or more hash functions to the second UE. The BS may determine a number of hash functions assigned to the second UE. The BS may include the determined number of hash functions in a DCI, which may be transmitted to a first UE. The first UE may include an indication of the determined number of hash functions in a SCI, which may be transmitted to the second UE. The second UE may use the determined number of hash functions to invoke corresponding hash functions and transmit PSHCH sequences to the first UE.

In certain aspects, an RSRP threshold may indicate an RSRP threshold value. In certain aspects, the RSRP threshold may indicate a RSRP threshold range. As noted above, a second UE may receive a SCI including the RSRP threshold from a first UE, which the first UE may receive in a DCI from a BS. The second UE may transmit a PSFCH sequence (e.g., one PRB sequence) when its RSRP value is within the RSRP threshold range. In certain aspects, the RSRP threshold range may be used when there are less number of proximity discovery resources. For example, the BS may initially transmit the DCI to the first UE for proximity discovery with a single RSRP threshold (=−62 dBm) and then with an RSRP threshold range of (−72 dBm, −62 dBm) to avoid collisions that may happen with one RSRP threshold of [−72 dBm, inf).

In certain aspects, a UE (operating in Mode 1) may perform a passive scan over a sidelink carrier (as an alternate to a proximity discovery technique) for determining proximate UEs and report the determined information to a BS. The UE may decode any received SCI from another UE. The UE may then compute an RSRP of other UE to determine whether the other UE is in proximity to the UE. In some cases, the UE may record a L1 source ID in the SCI and a L2 source ID in a MAC PDU. Upon determining a list of proximate UEs that may be nearby the UE, the UE may transmit the list of proximate UEs to the BS. The UE may transmit the list of proximate UEs to the BS as a new component in a L3 message of "UEAssistanceInformation." In some cases, the UE may transmit the list of proximate UEs to the BS as a new component in the L3 message of "SidelinkUEInformationNR." The UE may generate and send to the BS a new L3 measurement report with respect to the list of proximate UEs periodically, semi-persistently, or based on an event (i.e., event-driven). The UE may generate a new MAC-CE to carry the list of proximate UEs to the BS. In some cases, while reporting the list of proximate UEs to the BS, the UE may transmit a time interval during which the UE may have conducted the passive scan to the BS. The BS may use this time interval information to determine whether further proximity discovery is needed.

In certain aspects, a UE (operating in Mode 1) may conduct Uu sounding reference signal (SRS) based cross link interference (CLI) measurement (as an alternate to a proximity discovery technique) for determining proximate UEs when there may be no need to conduct a flexible time division duplex (TDD) over Uu interface. For example, when there may be no data flow established over Uu interface. The UE may report the determined proximate UEs to a BS. The BS may schedule the UEs based on the proximity between the UEs.

Figure 17:
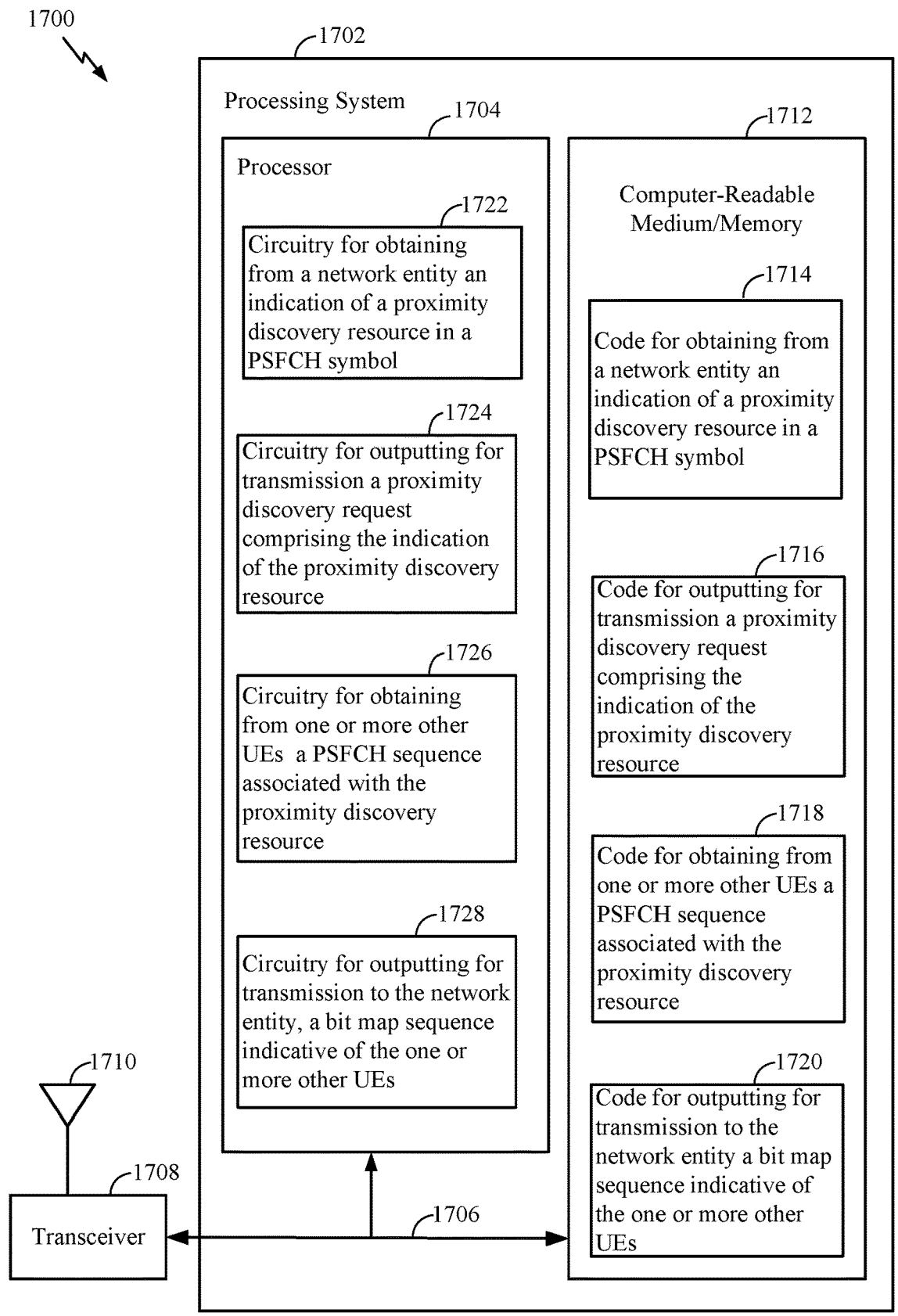
FIG. 17 illustrates a communications device that may include various components configured to perform operations for techniques disclosed herein, in accordance with certain aspects of the present disclosure.

FIG. 17 illustrates a communications device 1700 that may include various components (e.g., corresponding to means-plus-function components) configured to perform operations for the techniques disclosed herein, such as the operations illustrated in FIG. 9. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 is configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., a computer-executable code) that when executed by the processor 1704, cause the processor 1704 to perform the operations illustrated in FIG. 9, or other operations for performing the various techniques discussed herein. In certain aspects, computer-readable medium/memory 1712 stores code 1714 for obtaining, code 1716 for outputting for transmission, code 1718 for obtaining, and code 1720 for outputting for transmission. The code 1714 for obtaining may include code for obtaining, from a network entity, an indication of a proximity discovery resource in a PSFCH symbol. The code 1716 for outputting for transmission may include code for outputting for transmission a proximity discovery request comprising the indication of the proximity discovery resource. The code 1718 for obtaining may include code for obtaining, from one or more other UEs, a PSFCH sequence associated with the proximity discovery resource. The code 1720 for outputting for transmission may include code for outputting for transmission, to the network entity, a bit map sequence indicative of the one or more other UEs.

The processor 1704 may include circuitry configured to implement the code stored in the computer-readable medium/memory 1712, such as for performing the operations illustrated in FIG. 9, as well as other operations for performing the various techniques discussed herein. For example, the processor 1704 includes circuitry 1722 for obtaining, circuitry 1724 for outputting for transmission, circuitry 1726 for obtaining, and circuitry 1728 for outputting for transmission. The circuitry 1722 for obtaining may include circuitry for obtaining, from a network entity, an indication of a proximity discovery resource in a PSFCH symbol. The circuitry 1724 for outputting for transmission may include circuitry for outputting for transmission a proximity discovery request comprising the indication of the proximity discovery resource. The circuitry 1726 for obtaining may include circuitry for obtaining, from one or more other UEs, a PSFCH sequence associated with the proximity discovery resource. The circuitry 1728 for outputting for transmission may include circuitry for outputting for transmission, to the network entity, a bit map sequence indicative of the one or more other UEs.

Figure 18:
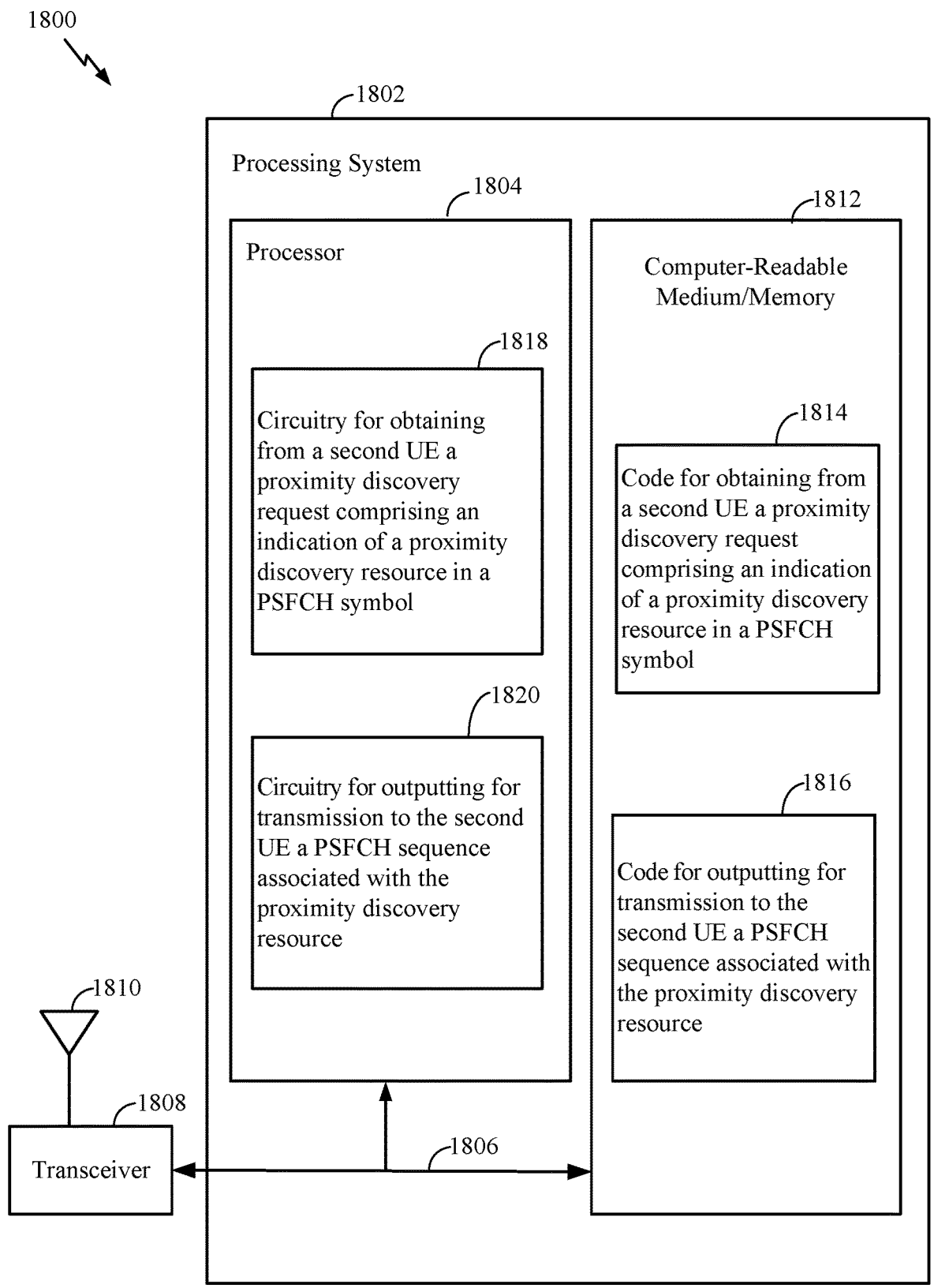
FIG. 18 illustrates a communications device that may include various components configured to perform operations for techniques disclosed herein, in accordance with certain aspects of the present disclosure.

FIG. 18 illustrates a communications device 1800 that may include various components (e.g., corresponding to means-plus-function components) configured to perform operations for the techniques disclosed herein, such as the operations illustrated in FIG. 10. The communications device 1800 includes a processing system 1802 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 is configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., a computer-executable code) that when executed by the processor 1804, cause the processor 1804 to perform the operations illustrated in FIG. 10, or other operations for performing the various techniques discussed herein. In certain aspects, computer-readable medium/memory 1812 stores code 1814 for obtaining and code 1816 for outputting for transmission. The code 1814 for obtaining may include code for obtaining, from a second UE, a proximity discovery request comprising an indication of a proximity discovery resource in a PSFCH symbol. The code 1816 for outputting for transmission may include code for outputting for transmission, to the second UE, a PSFCH sequence associated with the proximity discovery resource.

The processor 1804 may include circuitry configured to implement the code stored in the computer-readable medium/memory 1812, such as for performing the operations illustrated in FIG. 10, as well as other operations for performing the various techniques discussed herein. For example, the processor 1804 includes circuitry 1818 for obtaining and circuitry 1820 for outputting for transmission. The circuitry 1818 for obtaining may include circuitry for obtaining, from a second UE, a proximity discovery request comprising an indication of a proximity discovery resource in a PSFCH symbol. The circuitry 1820 for outputting for transmission may include circuitry for outputting for transmission, to the second UE, a PSFCH sequence associated with the proximity discovery resource.

Figure 19:
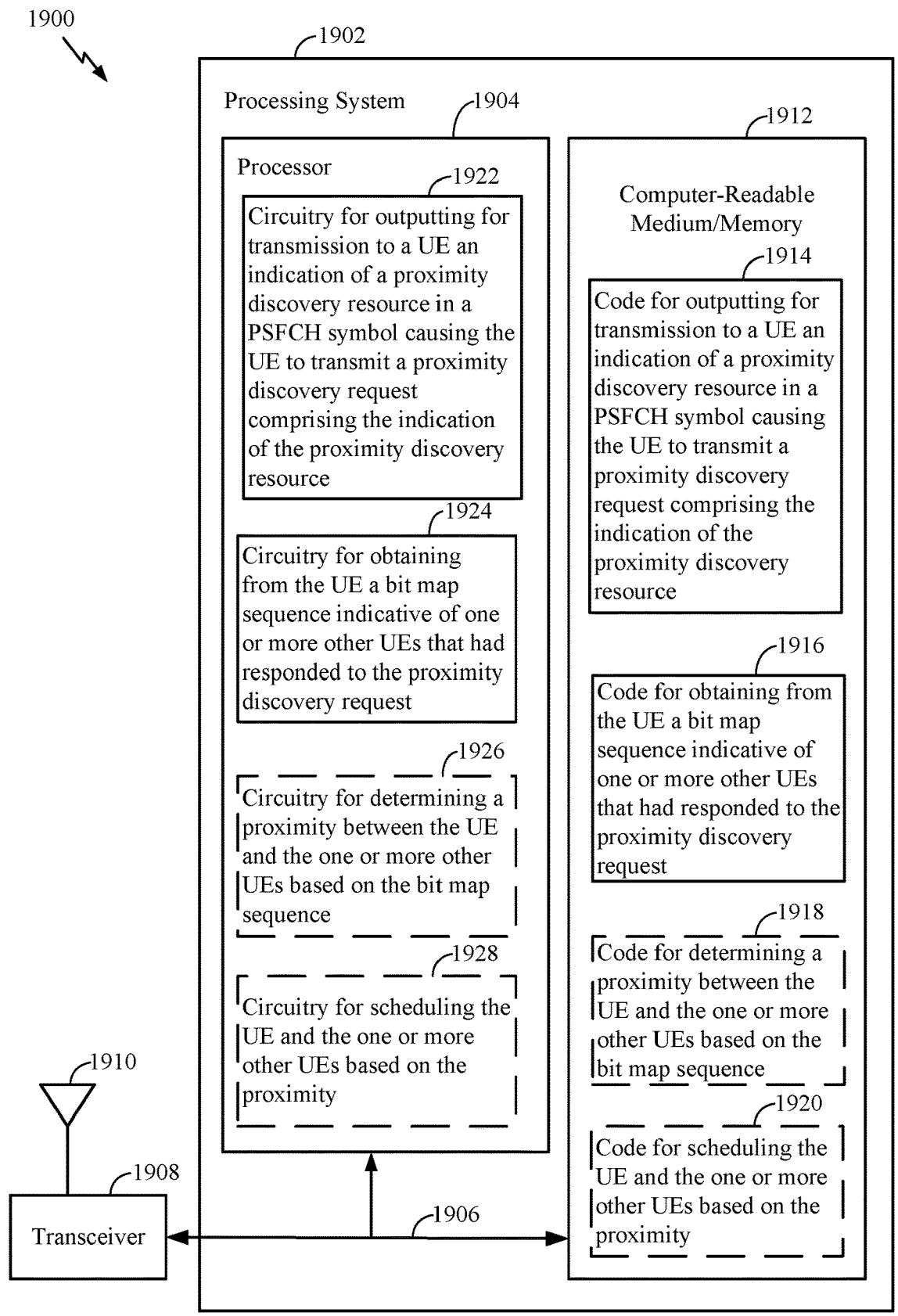
FIG. 19 illustrates a communications device that may include various components configured to perform operations for techniques disclosed herein, in accordance with certain aspects of the present disclosure.

FIG. 19 illustrates a communications device 1900 that may include various components (e.g., corresponding to means-plus-function components) configured to perform operations for the techniques disclosed herein, such as the operations illustrated in FIG. 11. The communications device 1900 includes a processing system 1902 coupled to a transceiver 1908 (e.g., a transmitter and/or a receiver). The transceiver 1908 is configured to transmit and receive signals for the communications device 1900 via an antenna 1910, such as the various signals as described herein. The processing system 1902 is configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/memory 1912 is configured to store instructions (e.g., a computer-executable code) that when executed by the processor 1904, cause the processor 1904 to perform the operations illustrated in FIG. 11, or other operations for performing the various techniques discussed herein. In certain aspects, computer-readable medium/memory 1912 stores code 1914 for outputting for transmission, code 1916 for obtaining, code 1918 for determining, and code 1920 for scheduling. The code 1914 for outputting for transmission may include code for outputting for transmission, to a UE, an indication of a proximity discovery resource in a PSFCH symbol causing the UE to transmit a proximity discovery request comprising the indication of the proximity discovery resource. The code 1916 for obtaining may include code for obtaining, from the UE, a bit map sequence indicative of one or more other UEs that had responded to the proximity discovery request. The code 1918 for determining may include code for determining a proximity between the UE and the one or more other UEs based on the bit map sequence. The code 1920 for scheduling may include code for scheduling the UE and the one or more other UEs based on the proximity.

The processor 1904 may include circuitry configured to implement the code stored in the computer-readable medium/memory 1912, such as for performing the operations illustrated in FIG. 11, as well as other operations for performing the various techniques discussed herein. For example, the processor 1904 includes circuitry 1922 for outputting for transmission, circuitry 1924 for obtaining, circuitry 1926 for determining, and circuitry 1928 for scheduling. The circuitry 1922 for outputting for transmission may include circuitry for outputting for transmission, to a UE, an indication of a proximity discovery resource in a PSFCH symbol causing the UE to transmit a proximity discovery request comprising the indication of the proximity discovery resource. The circuitry 1924 for obtaining may include circuitry for obtaining, from the UE, a bit map sequence indicative of one or more other UEs that had responded to the proximity discovery request. The circuitry 1926 for determining may include circuitry for determining a proximity between the UE and the one or more other UEs based on the bit map sequence. The circuitry 1928 for scheduling may include circuitry for scheduling the UE and the one or more other UEs based on the proximity.

Example Aspects

Implementation examples are described in the following numbered aspects.

Aspect 1: A method for wireless communications by a user equipment (UE), comprising: receiving, from a network entity, an indication of a proximity discovery resource in a physical sidelink feedback channel (PSFCH) symbol; transmitting a proximity discovery request comprising the indication of the proximity discovery resource; receiving, from one or more other UEs, a PSFCH sequence associated with the proximity discovery resource; and transmitting, to the network entity, a bit map sequence indicative of the one or more other UEs.

Aspect 2: The method of Aspect 1, wherein the indication is received via a downlink control information (DCI), and wherein the DCI grants the proximity discovery resource comprising physical resource blocks (PRBs) in the PSFCH symbol.

Aspect 3: The method of Aspect 2, wherein: the DCI comprises at least one of: an identification (ID) or a reference signal received power (RSRP) threshold; and the proximity discovery request is transmitted via a sidelink control information (SCI) comprising the proximity discovery request, wherein the SCI further comprises at least one of: the ID or the RSRP threshold.

Aspect 4: The method of Aspect 2, wherein the PSFCH sequence is received from the one or more UEs over a corresponding PSFCH resource block.

Aspect 5: The method of Aspect 4, wherein the DCI comprises at least one of: an identification (ID) or a reference signal received power (RSRP) threshold and the method further comprising: after receiving the PSFCH sequence, determining an energy level on the corresponding PSFCH resource block; when the energy level is within a range corresponding to the RSRP threshold, validating the PSFCH sequence in the proximity discovery resource; and when the energy level is not within the range corresponding to the RSRP threshold, setting a bit to a particular value in the bit map sequence.

Aspect 6: The method of Aspect 3, wherein the DCI further comprises a specified random seed, and wherein the SCI further comprises the specified random seed to be used by the one or more other UEs for computing an index in the proximity discovery resource.

Aspect 7: The method of Aspect 3, wherein the RSRP threshold indicates at least one of: a RSRP threshold value or a RSRP threshold range.

Aspect 8: The method of Aspect 2, wherein the DCI comprises a physical uplink shared channel (PUSCH) resource for carrying a media access control (MAC)—control element (CE), and wherein the bit map sequence it transmitted to the network entity via the MAC-CE.

Aspect 9: The method of Aspect 2, wherein the DCI comprises a transmit precoding configuration and the method further comprising: using the transmit precoding configuration to transmit the proximity discovery request.

Aspect 10: A method for wireless communications by a first user equipment (UE), comprising: receiving, from a second UE, a proximity discovery request comprising an indication of a proximity discovery resource in a physical sidelink feedback channel (PSFCH) symbol; and transmitting, to the second UE, a PSFCH sequence associated with the proximity discovery resource.

Aspect 11: The method of Aspect 10, wherein the reception comprises: receiving a sidelink control information (SCI) comprising the proximity discovery request, wherein the SCI further comprises at least one of: an identification (ID) or a reference signal received power (RSRP) threshold.

Aspect 12: The method of Aspect 11, wherein the PSFCH sequence is transmitted to the second UE if the SCI was transmitted by the second UE using a valid sidelink radio network temporary identifier (SL-RNTI).

Aspect 13: The method of Aspect 12, further comprising: determining a RSRP from a demodulation reference signal (DMRS) of the second UE; and when the RSRP is equal to or more the RSRP threshold, computing an index in the proximity discovery resource using a hashed value of the SL-RNTI, wherein the PSFCH sequence indicates the index in the proximity discovery resource.

Aspect 14: The method of Aspect 12, wherein the ID is a physical cell ID (PCI), and wherein the SL-RNTI is valid when the first UE has the SL-RNTI assigned by a network entity with the same PCI.

Aspect 15: The method of Aspect 12, wherein the ID is an operator ID, and wherein the SL-RNTI is valid when the first UE and a network entity are associated with the same operator ID.

Aspect 16: The method of Aspect 12, further comprising: obtaining a set via a system information block (SIB) or a radio resource control (RRC); and determining whether the ID is in the set, and wherein the SL-RNTI is valid when the ID is within the set.

Aspect 17: A method for wireless communications by a network entity, comprising: transmitting, to a user equipment (UE), an indication of a proximity discovery resource in a physical sidelink feedback channel (PSFCH) symbol causing the UE to transmit a proximity discovery request comprising the indication of the proximity discovery resource; and receiving, from the UE, a bit map sequence indicative of one or more other UEs that had responded to the proximity discovery request.

Aspect 18: The method of Aspect 17, further comprising: determining a proximity between the UE and the one or more other UEs based on the bit map sequence; and scheduling the UE and the one or more other UEs based on the proximity.

Aspect 19: The method of any one of Aspects 17-18, wherein the transmission comprises: transmitting, to the UE, a downlink control information (DCI), wherein the DCI grants the proximity discovery resource comprising physical resource blocks (PRBs) in the PSFCH symbol, and wherein the DCI comprises at least one of: an identification (ID) or a reference signal received power (RSRP) threshold.

Aspect 20: The method of Aspect 19, wherein the proximity discovery request is transmitted via a sidelink control information (SCI), and wherein the SCI further comprises at least one of: the ID or the RSRP threshold.

Aspect 21: The method of Aspect 19, further comprising: collecting all PRBs that are not used by hybrid automatic repeat request (HARQ) responses in the PSFCH symbol in a static discovery resource pool; and defining proximity discovery indices (PDIs) for respective proximity discovery resources in the static discovery resource pool.

Aspect 22: The method of any one of Aspects 17-21, further comprising: dynamically defining the proximity discovery resource in the PSFCH symbol to include a sequence opportunity for hybrid automatic repeat request (HARQ) responses.

Aspect 23: The method of Aspect 20, further comprising: transmitting, to the one or more other UEs, a hash function comprising a random seed to be used by the one or more other UEs to compute an index in the proximity discovery resource when there is no specified random seed within the SCI.

Aspect 24: The method of Aspect 20, further comprising: assigning two or more hash functions to the one or more other UEs.

Aspect 25: The method of Aspect 24, further comprising: determining a number of hash functions assigned to the one or more other UEs, wherein the DCI further comprises the determined number of hash functions.

Aspect 26: The method of Aspect 25, wherein the SCI further comprises the indication of the determined number of hash functions, the determined number being used by the one or more other UEs to invoke corresponding hash functions and transmit PSHCH sequences to the UE.

Aspect 27: A user equipment (UE), comprising: means for receiving, from a network entity, an indication of a proximity discovery resource in a physical sidelink feedback channel (PSFCH) symbol; means for transmitting a proximity discovery request comprising the indication of the proximity discovery resource; means for receiving, from one or more other UEs, a PSFCH sequence associated with the proximity discovery resource; and means for transmitting, to the network entity, a bit map sequence indicative of the one or more other UEs.

Aspect 28: The UE of Aspect 27, wherein the indication is received via a downlink control information (DCI), and wherein the DCI grants the proximity discovery resource comprising physical resource blocks (PRBs) in the PSFCH symbol.

Aspect 29: The UE of Aspect 28, wherein: the DCI comprises at least one of: an identification (ID) or a reference signal received power (RSRP) threshold; and the proximity discovery request is transmitted via a sidelink control information (SCI) comprising the proximity discovery request, wherein the SCI further comprises at least one of: the ID or the RSRP threshold.

Aspect 30: The UE of Aspect 28, wherein the PSFCH sequence is received from the one or more UEs over a corresponding PSFCH resource block.

Aspect 31: The UE of Aspect 30, wherein the DCI comprises at least one of: an identification (ID) or a reference signal received power (RSRP) threshold and the UE further comprising: means for determining, after receiving the PSFCH sequence, an energy level on the corresponding PSFCH resource block; means for validating, when the energy level is within a range corresponding to the RSRP threshold, the PSFCH sequence in the proximity discovery resource; and means for setting, when the energy level is not within the range corresponding to the RSRP threshold, a bit to a particular value in the bit map sequence.

Aspect 32: The UE of Aspect 29, wherein the DCI further comprises a specified random seed, and wherein the SCI further comprises the specified random seed to be used by the one or more other UEs for computing an index in the proximity discovery resource.

Aspect 33: The UE of Aspect 29, wherein the RSRP threshold indicates at least one of: a RSRP threshold value or a RSRP threshold range.

Aspect 34: The UE of Aspect 28, wherein the DCI comprises a physical uplink shared channel (PUSCH) resource for carrying a media access control (MAC)—control element (CE), and wherein the bit map sequence it transmitted to the network entity via the MAC-CE.

Aspect 35: The UE of Aspect 28, wherein: the DCI comprises a transmit precoding configuration; and the means for transmitting uses the transmit precoding configuration to transmit the proximity discovery request.

Aspect 36: A first user equipment (UE), comprising: means for receiving, from a second UE, a proximity discovery request comprising an indication of a proximity discovery resource in a physical sidelink feedback channel (PSFCH) symbol; and means for transmitting, to the second UE, a PSFCH sequence associated with the proximity discovery resource.

Aspect 37: The first UE of Aspect 36, wherein the reception comprises: means for receiving a sidelink control information (SCI) comprising the proximity discovery request, wherein the SCI further comprises at least one of: an identification (ID) or a reference signal received power (RSRP) threshold.

Aspect 38: The first UE of Aspect 37, wherein the PSFCH sequence is transmitted to the second UE if the SCI was transmitted by the second UE using a valid sidelink radio network temporary identifier (SL-RNTI).

Aspect 39: The first UE of Aspect 38, further comprising: means for determining a RSRP from a demodulation reference signal (DMRS) of the second UE; and means for computing, when the RSRP is equal to or more the RSRP threshold, an index in the proximity discovery resource using a hashed value of the SL-RNTI, wherein the PSFCH sequence indicates the index in the proximity discovery resource.

Aspect 40: The first UE of Aspect 38, wherein the ID is a physical cell ID (PCI), and wherein the SL-RNTI is valid when the first UE has the SL-RNTI assigned by a network entity with the same PCI.

Aspect 41: The first UE of Aspect 38, wherein the ID is an operator ID, and wherein the SL-RNTI is valid when the first UE and a network entity are associated with the same operator ID.

Aspect 42: The first UE of Aspect 38, further comprising: means for obtaining a set via a system information block (SIB) or a radio resource control (RRC); and means for determining whether the ID is in the set, and wherein the SL-RNTI is valid when the ID is within the set.

Aspect 43: A network entity, comprising: means for transmitting, to a user equipment (UE), an indication of a proximity discovery resource in a physical sidelink feedback channel (PSFCH) symbol causing the UE to transmit a proximity discovery request comprising the indication of the proximity discovery resource; and means for receiving, from the UE, a bit map sequence indicative of one or more other UEs that had responded to the proximity discovery request.

Aspect 44: The network entity of Aspect 43, further comprising: means for determining a proximity between the UE and the one or more other UEs based on the bit map sequence; and means for scheduling the UE and the one or more other UEs based on the proximity.

Aspect 45: The network entity of any one of Aspects 43-44, wherein the means for transmitting comprises: means for transmitting, to the UE, a downlink control information (DCI), wherein the DCI grants the proximity discovery resource comprising physical resource blocks (PRBs) in the PSFCH symbol, and wherein the DCI comprises at least one of: an identification (ID) or a reference signal received power (RSRP) threshold.

Aspect 46: The network entity of Aspect 45, wherein the proximity discovery request is transmitted via a sidelink control information (SCI), and wherein the SCI further comprises at least one of: the ID or the RSRP threshold.

Aspect 47: The network entity of Aspect 45, further comprising: means for collecting all PRBs that are not used by hybrid automatic repeat request (HARQ) responses in the PSFCH symbol in a static discovery resource pool; and means for defining proximity discovery indices (PDIs) for respective proximity discovery resources in the static discovery resource pool.

Aspect 48: The network entity of any one of Aspects 43-47, further comprising: means for dynamically defining the proximity discovery resource in the PSFCH symbol to include a sequence opportunity for hybrid automatic repeat request (HARQ) responses.

Aspect 49: The network entity of Aspect 46, further comprising: means for transmitting, to the one or more other UEs, a hash function comprising a random seed to be used by the one or more other UEs to compute an index in the proximity discovery resource when there is no specified random seed within the SCI.

Aspect 50: The network entity of Aspect 46, further comprising: means for assigning two or more hash functions to the one or more other UEs.

Aspect 51: The network entity of Aspect 50, further comprising: means for determining a number of hash functions assigned to the one or more other UEs, wherein the DCI further comprises the determined number of hash functions.

Aspect 52: The network entity of Aspect 51, wherein the SCI further comprises the indication of the determined number of hash functions, the determined number being used by the one or more other UEs to invoke corresponding hash functions and transmit PSHCH sequences to the UE.

Aspect 53: A user equipment (UE), comprising: a receiver configure to receive, from a network entity, an indication of a proximity discovery resource in a physical sidelink feedback channel (PSFCH) symbol; and a transmitter configured to transmit a proximity discovery request comprising the indication of the proximity discovery resource, wherein the receiver is further configured to receive, from one or more other UEs, a PSFCH sequence associated with the proximity discovery resource and the transmitter is further configured to transmit, to the network entity, a bit map sequence indicative of the one or more other UEs.

Aspect 54: The UE of Aspect 53, wherein the indication is received via a downlink control information (DCI), and wherein the DCI grants the proximity discovery resource comprising physical resource blocks (PRBs) in the PSFCH symbol.

Aspect 55: The UE of Aspect 54, wherein: the DCI comprises at least one of: an identification (ID) or a reference signal received power (RSRP) threshold; and the proximity discovery request is transmitted via a sidelink control information (SCI) comprising the proximity discovery request, wherein the SCI further comprises at least one of: the ID or the RSRP threshold.

Aspect 56: The UE of Aspect 54, wherein the PSFCH sequence is received from the one or more UEs over a corresponding PSFCH resource block.

Aspect 57: The UE of Aspect 56, wherein the DCI comprises at least one of: an identification (ID) or a reference signal received power (RSRP) threshold and the UE further comprising a processing system configured to determine, after receiving the PSFCH sequence, an energy level on the corresponding PSFCH resource block, validate, when the energy level is within a range corresponding to the RSRP threshold, the PSFCH sequence in the proximity discovery resource, and set, when the energy level is not within the range corresponding to the RSRP threshold, a bit to a particular value in the bit map sequence.

Aspect 58: The UE of Aspect 55, wherein the DCI further comprises a specified random seed, and wherein the SCI further comprises the specified random seed to be used by the one or more other UEs for computing an index in the proximity discovery resource.

Aspect 59: The UE of Aspect 55, wherein the RSRP threshold indicates at least one of: a RSRP threshold value or a RSRP threshold range.

Aspect 60: The UE of Aspect 54, wherein the DCI comprises a physical uplink shared channel (PUSCH) resource for carrying a media access control (MAC)—control element (CE), and wherein the bit map sequence it transmitted to the network entity via the MAC-CE.

Aspect 61: The UE of Aspect 54, wherein: the DCI comprises a transmit precoding configuration; and the transmitter uses the transmit precoding configuration to transmit the proximity discovery request.

Aspect 62: A first user equipment (UE), comprising: a receiver configured to receive, from a second UE, a proximity discovery request comprising an indication of a proximity discovery resource in a physical sidelink feedback channel (PSFCH) symbol; and a transmitter configured to transmit, to the second UE, a PSFCH sequence associated with the proximity discovery resource.

Aspect 63: The first UE of Aspect 62, wherein the reception comprises: receiving a sidelink control information (SCI) comprising the proximity discovery request, wherein the SCI further comprises at least one of: an identification (ID) or a reference signal received power (RSRP) threshold.

Aspect 64: The first UE of Aspect 63, wherein the PSFCH sequence is transmitted to the second UE if the SCI was transmitted by the second UE using a valid sidelink radio network temporary identifier (SL-RNTI).

Aspect 65: The first UE of Aspect 64, further comprising: a processing system configured to determine a RSRP from a demodulation reference signal (DMRS) of the second UE, and compute, when the RSRP is equal to or more the RSRP threshold, an index in the proximity discovery resource using a hashed value of the SL-RNTI, wherein the PSFCH sequence indicates the index in the proximity discovery resource.

Aspect 66: The first UE of Aspect 64, wherein the ID is a physical cell ID (PCI), and wherein the SL-RNTI is valid when the first UE has the SL-RNTI assigned by a network entity with the same PCI.

Aspect 67: The first UE of Aspect 64, wherein the ID is an operator ID, and wherein the SL-RNTI is valid when the first UE and a network entity are associated with the same operator ID.

Aspect 68: The first UE of Aspect 64, further comprising: a processing system configured to obtain a set via a system information block (SIB) or a radio resource control (RRC) and determine whether the ID is in the set, and wherein the SL-RNTI is valid when the ID is within the set.

Aspect 69: A network entity, comprising: a transmitter configured to transmit, to a user equipment (UE), an indication of a proximity discovery resource in a physical sidelink feedback channel (PSFCH) symbol causing the UE to transmit a proximity discovery request comprising the indication of the proximity discovery resource; and a receiver configured to receive, from the UE, a bit map sequence indicative of one or more other UEs that had responded to the proximity discovery request.

Aspect 70: The network entity of Aspect 69, further comprising: a processing system configured to determine a proximity between the UE and the one or more other UEs based on the bit map sequence and schedule the UE and the one or more other UEs based on the proximity.

Aspect 71: The network entity of any one of Aspects 69-70, wherein the transmission comprises: transmitting, to the UE, a downlink control information (DCI), wherein the DCI grants the proximity discovery resource comprising physical resource blocks (PRB s) in the PSFCH symbol, and wherein the DCI comprises at least one of: an identification (ID) or a reference signal received power (RSRP) threshold.

Aspect 72: The network entity of Aspect 71, wherein the proximity discovery request is transmitted via a sidelink control information (SCI), and wherein the SCI further comprises at least one of: the ID or the RSRP threshold.

Aspect 73: The network entity of Aspect 71, further comprising: a processing system configured to collect all PRBs that are not used by hybrid automatic repeat request (HARQ) responses in the PSFCH symbol in a static discovery resource pool and define proximity discovery indices (PDIs) for respective proximity discovery resources in the static discovery resource pool.

Aspect 74: The network entity of any one of Aspects 69-73, further comprising: a processing system configured to dynamically defining the proximity discovery resource in the PSFCH symbol to include a sequence opportunity for hybrid automatic repeat request (HARQ) responses.

Aspect 75: The network entity of Aspect 72, wherein: the transmitter is further configured to transmit, to the one or more other UEs, a hash function comprising a random seed to be used by the one or more other UEs to compute an index in the proximity discovery resource when there is no specified random seed within the SCI.

Aspect 76: The network entity of Aspect 72, further comprising: a processing system configured to assign two or more hash functions to the one or more other UEs.

Aspect 77: The network entity of Aspect 76, wherein: the processing system is further configured to determine a number of hash functions assigned to the one or more other UEs, wherein the DCI further comprises the determined number of hash functions.

Aspect 78: The network entity of Aspect 77, wherein the SCI further comprises the indication of the determined number of hash functions, the determined number being used by the one or more other UEs to invoke corresponding hash functions and transmit PSHCH sequences to the UE.

Aspect 79: An apparatus for wireless communications by a user equipment (UE), comprising an interface configured to obtain, from a network entity, an indication of a proximity discovery resource in a physical sidelink feedback channel (PSFCH) symbol; and a processing system configured to generate a proximity discovery request comprising the indication of the proximity discovery resource, wherein: the interface is further configured to obtain, from one or more other UEs, a PSFCH sequence associated with the proximity discovery resource and output to the proximity discovery request for transmission; the processing system is further configured to generate a bit map sequence indicative of the one or more other UEs; and the interface is further configured to output, for transmission to the network entity, the bit map sequence indicative of the one or more other UEs.

Aspect 80: An apparatus for wireless communications by a first user equipment (UE), comprising: an interface configured to obtain, from a second UE, a proximity discovery request comprising an indication of a proximity discovery resource in a physical sidelink feedback channel (PSFCH) symbol and output, for transmission to the second UE, a PSFCH sequence associated with the proximity discovery resource.

Aspect 81: An apparatus for wireless communications by a network entity, comprising: a processing system configured to generate an indication of a proximity discovery resource in a physical sidelink feedback channel (PSFCH) symbol causing the UE to transmit a proximity discovery request comprising the indication of the proximity discovery resource; and an interface configured to output, for transmission to a user equipment (UE), the indication and obtain, from the UE, a bit map sequence indicative of one or more other UEs that had responded to the proximity discovery request.

Aspect 82: A computer-readable medium for wireless communications by a user equipment (UE), comprising codes executable to: obtain, from a network entity, an indication of a proximity discovery resource in a physical sidelink feedback channel (PSFCH) symbol; generate a proximity discovery request comprising the indication of the proximity discovery resource; obtain, from one or more other UEs, a PSFCH sequence associated with the proximity discovery resource; output to the proximity discovery request for transmission; generate a bit map sequence indicative of the one or more other UEs; and output, for transmission to the network entity, the bit map sequence indicative of the one or more other UEs.

Aspect 83: A computer-readable medium for wireless communications by a first user equipment (UE), comprising codes executable to: obtain, from a second UE, a proximity discovery request comprising an indication of a proximity discovery resource in a physical sidelink feedback channel (PSFCH) symbol; and output, for transmission to the second UE, a PSFCH sequence associated with the proximity discovery resource.

Aspect 84: A computer-readable medium for wireless communications by a network entity, comprising codes executable to: generate an indication of a proximity discovery resource in a physical sidelink feedback channel (PSFCH) symbol causing the UE to transmit a proximity discovery request comprising the indication of the proximity discovery resource; output, for transmission to a user equipment (UE), the indication; and obtain, from the UE, a bit map sequence indicative of one or more other UEs that had responded to the proximity discovery request.

Additional Considerations

The techniques described herein may be used for various wireless communication technologies, such as new radio (NR) (e.g., 5th generation (5G) NR), 3GPP long term evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and base station (BS), next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by user equipments (UEs) with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform operations 900 of FIG. 9, operations 1000 of FIG. 10 and/or operations 1100 of FIG. 11.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for determining, means for validating, means for setting, means for computing, means for scheduling, means for collecting, means for assigning and means for defining may include a processing system, which may include one or more processors, such as processors 258, 264 and 266, and/or controller/processor 280 of the UE 120a and/or processors 220, 230, 238, and/or controller/processor 240 of the BS 110a shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9, FIG. 10, and/or FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method for wireless communication at a user equipment (UE), comprising:
receiving, from a network entity, an indication of a proximity discovery resource in a physical sidelink feedback channel (PSFCH) symbol;
broadcasting a proximity discovery request comprising the indication of the proximity discovery resource;
receiving, from one or more other UEs in response to receiving the broadcasted proximity discovery request, a PSFCH sequence associated with the proximity discovery resource; and
transmitting, to the network entity, a bit map sequence associated with the one or more other UEs.

2. The method of claim 1, wherein the indication is received via a downlink control information (DCI), and wherein the DCI grants the proximity discovery resource comprising physical resource blocks (PRBs) in the PSFCH symbol.

3. The method of claim 2, wherein
the DCI comprises at least one of: an identification (ID) or a reference signal received power (RSRP) threshold; and
the proximity discovery request is broadcasted via a sidelink control information (SCI) comprising the proximity discovery request, wherein the SCI further comprises at least one of: the ID or the RSRP threshold.

4. The method of claim 2, wherein the PSFCH sequence is received from the one or more UEs over a corresponding PSFCH resource block.

5. The method of claim 4, wherein the DCI comprises at least one of: an identification (ID) or a reference signal received power (RSRP) threshold and the method further comprising:
after receiving the PSFCH sequence, determining an energy level on the corresponding PSFCH resource block;
when the energy level is within a range corresponding to the RSRP threshold, validating the PSFCH sequence in the proximity discovery resource; and
when the energy level is not within the range corresponding to the RSRP threshold, setting a bit to a particular value in the bit map sequence.

6. The method of claim 3, wherein the DCI further comprises a specified random seed, and wherein the SCI further comprises the specified random seed to be used by the one or more other UEs for computing an index in the proximity discovery resource.

7. The method of claim 3, wherein the RSRP threshold indicates at least one of: an RSRP threshold value or an RSRP threshold range.

8. The method of claim 2, wherein the DCI comprises a physical uplink shared channel (PUSCH) resource for carrying a media access control (MAC)—control element (CE), and wherein the bit map sequence it transmitted to the network entity via the MAC-CE.

9. The method of claim 2, wherein the DCI comprises a transmit precoding configuration and the method further comprising:
using the transmit precoding configuration to transmit the proximity discovery request.

10. A method for wireless communications by a first user equipment (UE), comprising:
receiving, from a second UE, a proximity discovery request comprising an indication of a proximity discovery resource in a physical sidelink feedback channel (PSFCH) symbol;
receiving a sidelink control information (SCI) comprising the proximity discovery request, wherein the SCI further comprises at least one of: an identification (ID) or a reference signal received power (RSRP) threshold,
transmitting, to the second UE, a PSFCH sequence associated with the proximity discovery resource, wherein the PSFCH sequence indicates an index of the first UE in the proximity discovery resource, wherein the PSFCH sequence is transmitted to the second UE in response to determining that the SCI was transmitted by the second UE using a valid sidelink radio network temporary identifier (SL-RNTI);
obtaining a set via a system information block (SIB) or a radio resource control (RRC); and
wherein the SL-RNTI is valid when the ID is within the set.

11. The method of claim 10, further comprising:
determining an RSRP from a demodulation reference signal (DMRS) of the second UE; and
when the RSRP is equal to or more the RSRP threshold, computing the index in the proximity discovery resource using a hashed value of the SL-RNTI.

12. The method of claim 10, wherein the ID is a physical cell ID (PCI), and wherein the SL-RNTI is valid when the first UE has the SL-RNTI assigned by a network entity with the same PCI.

13. The method of claim 10, wherein the ID is an operator ID, and wherein the SL-RNTI is valid when the first UE and a network entity are associated with the same operator ID.

14. A method for wireless communications by a network entity, comprising:
transmitting, to a user equipment (UE), an indication of a proximity discovery resource in a physical sidelink feedback channel (PSFCH) symbol causing the UE to broadcast a proximity discovery request comprising the indication of the proximity discovery resource; and
receiving, from the UE, a bit map sequence associated with one or more other UEs that had responded to the proximity discovery request.

15. The method of claim 14, further comprising:
determining a proximity between the UE and the one or more other UEs based on the bit map sequence; and
scheduling the UE and the one or more other UEs based on the proximity.

16. The method of claim 14, wherein the transmitting comprises:
transmitting, to the UE, a downlink control information (DCI), wherein the DCI grants the proximity discovery resource comprising physical resource blocks (PRBs) in the PSFCH symbol, and wherein the DCI comprises at least one of: an identification (ID) or a reference signal received power (RSRP) threshold.

17. The method of claim 16, wherein the proximity discovery request is broadcasted via a sidelink control information (SCI), and wherein the SCI further comprises at least one of: the ID or the RSRP threshold.

18. The method of claim 17, further comprising:
collecting all PRBs that are not used by hybrid automatic repeat request (HARQ) responses in the PSFCH symbol in a static discovery resource pool; and
defining proximity discovery indices (PDIs) for respective proximity discovery resources in the static discovery resource pool.

19. The method of claim 14, further comprising:
dynamically defining the proximity discovery resource in the PSFCH symbol to include a sequence opportunity for hybrid automatic repeat request (HARQ) responses.

20. An apparatus for wireless communication, comprising:
a processor,
memory coupled with the processor; and
instructions stored in the memory and executable by the processor to cause the apparatus to:
receive, from a network entity, an indication of a proximity discovery resource in a physical sidelink feedback channel (PSFCH) symbol;
broadcast a proximity discovery request comprising the indication of the proximity discovery resource;
receive, from one or more other UEs, a PSFCH sequence associated with the proximity discovery resource; and
transmit, to the network entity, a bit map sequence associated with the one or more other UEs.

* * * * *